US011937207B2

(12) United States Patent
Agiwal

(10) Patent No.: US 11,937,207 B2
(45) Date of Patent: Mar. 19, 2024

(54) SYSTEM AND METHOD OF DETERMINING PAGING OCCASIONS FOR TRANSMITTING AND RECEIVING PAGING

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/891,578

(22) Filed: Aug. 19, 2022

(65) Prior Publication Data

US 2022/0394665 A1    Dec. 8, 2022

Related U.S. Application Data

(63) Continuation of application No. 17/140,416, filed on Jan. 4, 2021, now Pat. No. 11,432,261, which is a
(Continued)

(51) Int. Cl.
*H04W 68/00* (2009.01)
*H04W 24/08* (2009.01)
*H04W 56/00* (2009.01)
*H04W 72/04* (2023.01)
*H04W 72/0446* (2023.01)
(Continued)

(52) U.S. Cl.
CPC ......... *H04W 68/005* (2013.01); *H04W 24/08* (2013.01); *H04W 56/001* (2013.01); *H04W 72/0446* (2013.01); *H04W 72/23* (2023.01); *H04W 76/28* (2018.02)

(58) Field of Classification Search
CPC ... H04W 68/005; H04W 76/28; H04W 72/23; H04W 72/0446; H04W 24/08; H04W 56/001
See application file for complete search history.

(56) References Cited

U.S. PATENT DOCUMENTS

2013/0107790 A1    5/2013  Lee et al.
2017/0303235 A1   10/2017  Deogun et al.
(Continued)

FOREIGN PATENT DOCUMENTS

EP        3998809 A1     5/2022
WO    2012138137 A2    10/2012
(Continued)

OTHER PUBLICATIONS

International Search Report dated Sep. 11, 2019, issued in International Application No. PCT/KR2019/006712.
(Continued)

*Primary Examiner* — Melvin C Marcelo
(74) *Attorney, Agent, or Firm* — Jefferson IP Law, LLP

(57) ABSTRACT

A communication method and system for converging a 5th-generation (5G) communication system for supporting higher data rates beyond a 4th-generation (4G) system with a technology for Internet of things (IoT) are provided. The t disclosure may be applied to intelligent services based on the 5G communication technology and the IoT-related technology, such as smart home, smart building, smart city, smart car, connected car, health care, digital education, smart retail, security and safety services. The disclosure provides a method and an apparatus for determining paging occasions (PO).

20 Claims, 12 Drawing Sheets

Related U.S. Application Data continuation of application No. 16/429,548, filed on Jun. 3, 2019, now Pat. No. 10,887,864.

(60) Provisional application No. 62/680,765, filed on Jun. 5, 2018.

(51) Int. Cl.
*H04W 72/23* (2023.01)
*H04W 76/28* (2018.01)

(56) References Cited

U.S. PATENT DOCUMENTS

| | | | |
|---|---|---|---|
| 2018/0124687 A1 | 5/2018 | Park et al. | |
| 2018/0324750 A1 | 11/2018 | Byun et al. | |

FOREIGN PATENT DOCUMENTS

| | | | |
|---|---|---|---|
| WO | 2017/078323 A1 | 5/2017 | |
| WO | 2017/171454 A1 | 10/2017 | |

OTHER PUBLICATIONS

Ericsson, 'Remaining details on paging design', R1-1806423, 3GPP TSG RAN WG1, Meeting #93, Busan, Korea, May 11, 2018.
OPPO, 'Paging transmission on NR-U', R1-1806855, 3GPP TSG RAN WG1 Meeting, #93, Busan, Korea, May 11, 2018.
Extended European Search Report dated May 31, 2021, issued by a counterpart European Application No. 19815979.0.
RAN2: "Reply LS on Agreements on Paging", 3GPP Draft; R2-1809175_LS_Paging, 3rd Generation Partnership Project (3GPP), Mobile Competence Centre ; 650, Route Des Lucioles ; F-06921 Sophia-Antipolis Cedex ; France, vol. RAN WG2, No. XP051520502, May 25, 2018 Busan, Korea.
Vice-Chairman (CMCC): "Report from breakout session", 3GPP Draft; R2-1808731 Report From Breakout Session (CMCC), 3rd Generation Partnership Project (3GPP), Mobile Competence Centre ; 650, Route Des Lucioles ; F-06921 Sophia-Antipolis Cedex ; France, vol. RAN WG2, No. XP051520111, May 25, 2018, Busan, Korea.
ETSI MCC: "Report of 3GPP TSG RAN2#101 bis meeting, Sanya, China", 3GPP Draft; R2-1806601,3rd Generation Partnership Project (3GPP), Mobile Competence Centre ; 650, Route Des Lucioles ; F-06921 Sophia-Antipolis Cedex ; France, vol. RAN WG2, No. XP051465116, May 20, 2018, Busan, Korea.
Mediatek Inc: "Paging Frame and Paging Occasion Calculation in NR", 3GPP Draft; R2-1807743 Paging Frame and Paging Occasion Calculation in NR, 3rd Generation Partnership Project (3GPP), Mobile Competence Centre ; 650, Route Des Lucioles ; F-06921 Sophia-Antipolis Cede, vol. RAN WG2, No. XP051444086, May 20, 2018, Busan, Korea.
Qualcomm Incorporated: "Report of Email Discussion [101bis#67] [NR] PO/PF calculation", 3GPP Draft; R2-1806885_NR_Pagingconf_Email_Discussion_Report, 3rd Generation Partnership Project (3GPP), Mobile Competence Centre ; 650, Route Des Lucioles ; F-06921 Sophia-Antipolis Cedex; France, vol. RAN WG2, No. XP051443326, May 20, 2018, Busan, Korea.
Mediatek Inc: "Paging Frame and Paging Occasion Calculation in NR", 3GPP Draft; R2-1807743 Paging Frame and Paging Occasion Calculation in NR, 3rd Generation Partnership Project (3GPP), Mobile Competence Centre ; 650, Route Des Lucioles ; F-06921 Sophia-Antipolis Cede, vol. RAN WG2, No. XP051464880, May 11, 2018, Busan, Korea.
Huawei et al: "PO/PF calculation for default association", 3GPP Draft; R2-1808395 PO-PF Calculation for Default Association, 3rd Generation Partnership Project (3GPP), Mobile Competence Centre ; 650, Route Des Lucioles ; F-06921 Sophia-Antipolis Cedex ; Franc, vol. RAN WG2, No. XP051519791, May 11, 2018, Busan, Korea.
Samsung: "Reference Frame & PO Determination: Non Default Association", 3GPP Draft; R2-1807689_Reference Frame & PO Determination_Non Default Association, 3rd Generation Partnership Project (3GPP), Mobile Competence Centre ; 650, Route Des Lucioles ; F-06921 Sophia-Antipo, vol. RAN WG2, No. XP051444041, May 20, 2018, Busan, South Korea.
Extended European Search Report dated Jan. 5, 2023, issued in European Patent Application No. 22204768.0.
Chinese Office Action dated Sep. 12, 2023, issued in Chinese Patent Application No. 201980038585.7.

SYSTEM AND METHOD OF DETERMINING PAGING OCCASIONS FOR TRANSMITTING AND RECEIVING PAGING

CROSS-REFERENCE TO RELATED APPLICATION(S)

This application is a continuation application of prior application Ser. No. 17/140,416, filed on Jan. 4, 2021, which will be issued as U.S. Pat. No. 11,432,261 on Aug. 30, 2022; which is a continuation application of prior application Ser. No. 16/429,548, filed on Jun. 3, 2019, which has issued as U.S. Pat. No. 10,887,864 on Jan. 5, 2021, which is based on and claimed priority under 35 U.S.C. § 119(e) of a U.S. Provisional application Ser. No. 62/680,765, filed on Jun. 5, 2018, in the U.S. Patent and Trademark Office, the disclosure of which is incorporated by reference herein in its entirety.

BACKGROUND

1. Field

The disclosure relates to a wireless communication system. More particularly, the disclosure relates to an apparatus, a method and a system for determining paging occasions (PO) for transmitting and receiving paging in wireless communication system.

2. Description of Related Art

To meet the demand for wireless data traffic that has increased since deployment of 4th-generation (4G) communication systems, efforts have been made to develop an improved 5th-generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

Meanwhile, there have been various studies on paging for 5G communication system recently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for performing a random access back off in wireless communication system.

Additional aspects will be set forth in part in the description which follows and, in part, will be apparent from the description, or may be learned by practice of the presented embodiments.

In accordance with an aspect of the disclosure, a method by a terminal for determining paging occasion (PO) is provided. The method includes receiving, from a base station (BS), first information on a number of paging frames in a discontinuous reception (DRX) cycle and second information on a number of POs for a paging frame, identifying a paging frame based on the first information, identifying an index of a PO based on the first information and the second information, and monitoring a paging in one or more physical downlink control channel (PDCCH) based on the index.

In accordance with another aspect of the disclosure, a terminal for determining PO is provided. The terminal comprises a transceiver configured to transmit and receive a signal, and a controller configured to receive, from a BS, first information on a number of paging frames in a DRX cycle and second information on a number of POs for a paging frame, identify a paging frame based on the first information, identify an index of a PO based on the first information and the second information, and monitor a paging in one or more PDCCH based on the index.

In accordance with another aspect of the disclosure, a method by a BS for determining PO is provided. The method comprises transmitting, to a terminal, first information on a number of the paging frames in a DRX cycle and second information on a number of POs for a paging frame, and transmitting, to the terminal, downlink control information (DCI) for paging in a PO in a paging frame, wherein the paging frame is identified based on the first information, and wherein an index for the PO is identified based on the first information and the second information, and wherein one or more PDCCH is monitored for the DCI for paging based on the index.

In accordance with another aspect of the disclosure, a BS for determining PO is provided. The BS comprises a transceiver configured to transmit and receive a signal, and a controller configured to transmit, to a terminal, first information on a number of paging frames in a DRX cycle and second information on a number of POs for a paging frame, and transmit, to the terminal, DCI for paging in a PO in a paging frame, wherein the paging frame is identified based on the first information, and wherein an index for the PO is identified based on the first information and the second information, and wherein one or more PDCCH is monitored for the DCI for paging based on the index.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
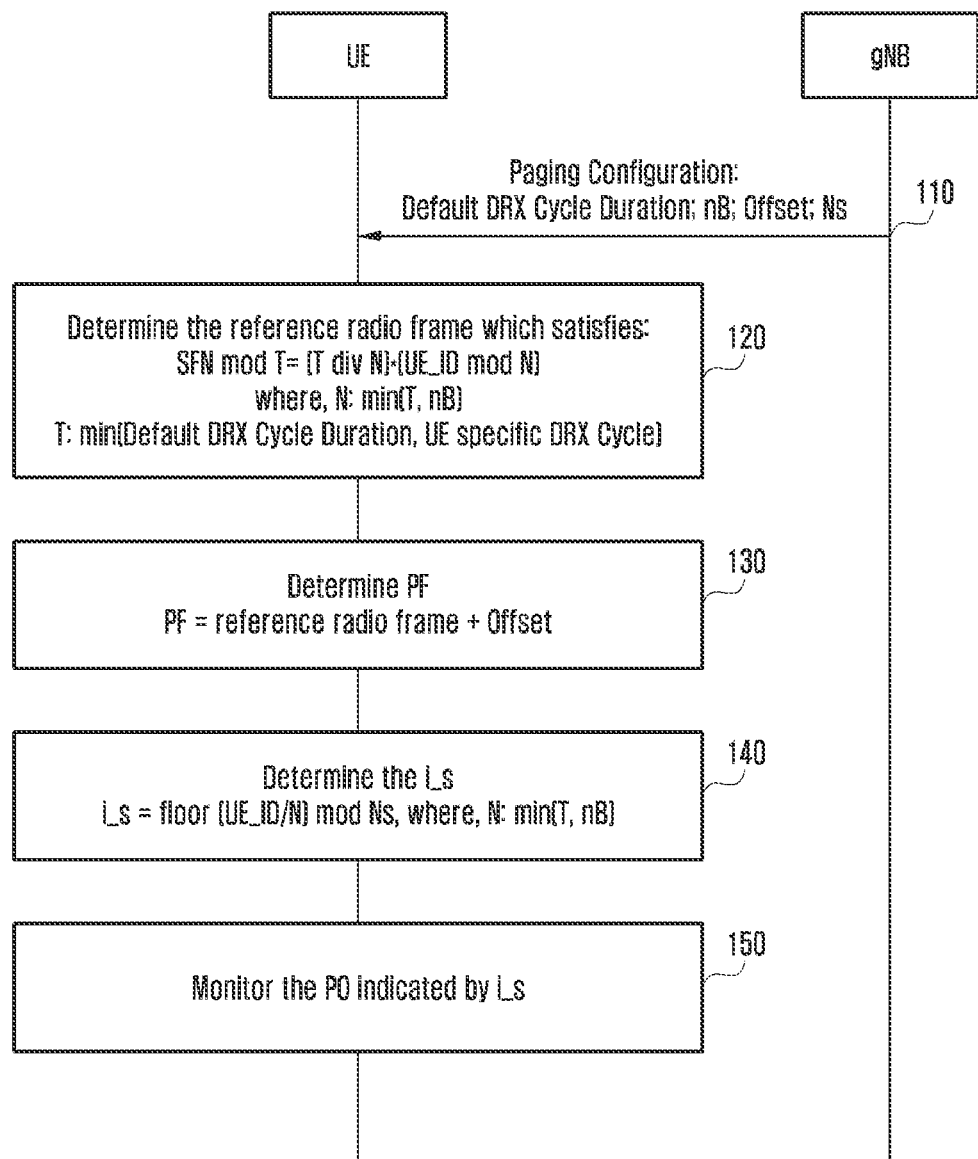
FIG. 1 illustrates an example of determining paging occasion (PO) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The 2nd-generation (2G) wireless communication system has been developed to provide voice services while ensuring the mobility of users. 3rd-generation (3G) wireless communication system supports not only the voice service but also data service. In recent years, the 4th-generation (4G) communication system has been developed to provide high-speed data service. However, currently, the 4G wireless communication system suffers from lack of resources to meet the growing demand for high speed data services. So 5th-generation (5G) wireless communication system is being developed to meet the growing demand for high speed data services, support ultra-reliability and low latency applications.

The 5G wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive multiple-input multiple-output (MIMO), full dimensional MIMO (FD-MIMO), array antenna, an analog beam forming, large scale antenna techniques are being considered in the design of fifth generation wireless communication system. In addition, the 5G wireless communication system is expected to address different use cases having quite different requirements in terms of data rate, latency, reliability, mobility, etc. However, it is expected that the design of the air-interface of the 5G wireless communication system would be flexible enough to serve the UEs having quite different capabilities depending on the use case and market segment the UE cater service to the end customer. Example use cases the 5G wireless communication system wireless system is expected to address is enhanced mobile broadband (eMBB), massive machine type communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the IoT/IoE envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the existing wireless communication system, the paging is transmitted to page the UE which are attached to the wireless communication network but are in idle mode. In the idle mode the UE wake ups at regular intervals (every paging discontinuous reception (DRX) cycle) for short periods to receive paging and other broadcast information. In a legacy system, the UE monitors one paging occasion (PO) every DRX cycle. One PO is a subframe/transmission time interval (TTI) of 1 ms duration. There can be several POs in a paging DRX cycle. The UE determines its PO based on UE ID. The UE first determines the paging frame (PF) and then determine its PO amongst the PO(s) within the determined PF. One PF is radio frame (10 ms), which may contain one or multiple POs. Every radio frame in a DRX cycle can be a PF. There can be up to four POs in a PF. The subframes which can be PO in a PF are pre-defined i.e. subframe #0, subframe #4, subframe #5 and subframe #9. The network signals two parameters. The first parameter is 'T' i.e. paging DRX cycle duration in number of radio frames. The second parameter is 'nB' i.e. the total number of POs in a paging DRX cycle. The parameter nB can be configured to one value amongst 4T, 2T, T, T/2, T/4, T/8, T/16, or T/32. UEs are distributed across several POs in the DRX cycle based on UE ID. Several UEs can be mapped to the same PO.

The PF for a UE is the radio frame with system frame number 'SFN (system frame number)' which satisfies the equation SFN mod T=(T div N)*(UE_ID mod N); where N is equal to min (T, nB) and the UE_ID is equal to IMSI (International Mobile Subscriber Identity) mod 1024. Within the determined PF, the PO corresponds to i_s=floor (UE_ID/N) mod Ns; where Ns: max (1, nB/T); i_s can be 0, 1, 2 and 3. Mapping between i_s, Ns and subframe within the paging frame is pre-defined.

In a PO, paging message is transmitted using physical downlink shared channel (PDSCH). A physical downlink common control channel (PDCCH) scheduling PDSCH carrying paging message is addressed to a P-RNTI (paging-radio network temporary identifier) if there is a paging message in PDSCH. The P-RNTI is common for all UEs. So, the UE identity (i.e. IMSI or SAE-temporary mobile subscriber identity (S-TMSI)) is included in paging message to indicate paging for a specific UE. The paging message may include multiple UE identities to page multiple UEs. The paging message is broadcasted (i.e. PDCCH is masked with P-RNTI) over the data channel (i.e. PDSCH).

In the existing method of determining PO, for nB<=T, there is only one PO in PF. For nB>T, there are multiple POs in a PF and every radio frame in paging DRX cycle is a PF. So, for configuring multiple POs in a PF, network has to configure nB>T and as a result every radio frame in DRX cycle becomes a PF. It is not possible to configure some of the radio frames in DRX cycle as PF and have multiple POs in these PFs. This is a serious limitation in current design. In beamformed system a set of synchronization signal blocks (SSBs) are periodically transmitted using beam sweeping. UE can measure these SSBs and identify the TX/RX beam for receiving paging. For longer SSB periodicity (such as 20, 40, 80, 160 ms), multiple POs needs to configured at an interval longer than radio frame to meet the paging capacity.

An enhanced method of determining PO is needed.

Embodiment 1

FIG. 1 illustrates an example of determining PO according to an embodiment of the disclosure.

Referring to FIG. 1:

0) A UE acquires the paging configuration (Default DRX Cycle Duration, nB, Ns, Offset), paging search space configuration (if signaled by the network) and the RMSI (remaining system information) configuration (e.g. the RMSI search space, the RMSI pattern info: Pattern 1, 2, 3) from the system information signaled by the network (110). The RMSI is also be referred as SIB1. The RMSI pattern is also referred as SS/P BCH block and CORESET multiplexing pattern. In radio resource control (RRC) Connected State, the paging search space configuration is signaled by the network for one or more configured bandwidth part(s) (BWP(s)) in dedicated signaling and the UE uses the paging search space configuration of its active DL BWP.

1) The UE first derives a reference radio frame (120). The reference frame is the radio frame with SFN which satisfies following Equation 1:

$$SFN \bmod T = (T \text{ div } N)*(UE\_ID \bmod N) \quad \text{Equation 1}$$

Where,

T: DRX cycle of the UE. T is determined by the shortest of the UE specific DRX values, if configured by the RRC or by the upper layers (e.g. non-access stratum (NAS)), and a default DRX value signaled in the system information. If the UE specific DRX is not configured by the RRC or by the upper layers, the default value is applied.

nB: nB is the number of paging frames in DRX cycle. nB is signaled by the gNB in the system information. The values of nB can be T, T/2, T/4, T/8, T/16, T/32 and so on. It is to be noted that in legacy system nB is the number of POs in DRX cycle.

N; min(T, nB)

In an example, the UE_ID can be {IMSI mod 1024} or {5G-S-TMSI mod 1024}.

2) The UE then determines the paging frame, where the paging frame is the radio frame having an SFN equal to 'SFN of reference frame+offset' (130). The Parameter Offset is signalled by the gNB in the system information. Offset is in units of radio frames. For example, if the determined reference frame is SFN 'X' and the offset signalled by the network is 'Y', paging frame is the radio frame were the SFN equals X+Y.

Paging frame is the radio frame with respect to which the UE determines its PO. A PO associated with a PF may start in the PF or after the PF. A PO which starts in the paging frame may end in the subsequent radio frame. 3) The UE then calculates an index i_s (140), where i_s is derived from the following Equation 2:

$$i\_s = \text{floor}(UE\_ID/N) \bmod Ns, \text{ where} \quad \text{Equation 2}$$

Ns: Ns*nB indicates the total number of POs in DRX cycle. Ns is the number of POs corresponding to or associated with a PF. The parameter Ns is signaled by the gNB in the system information.

N; min(T, nB)

In an example, the UE_ID can be IMSI mod 1024.

4) A UE monitors the PO indicated by i_s (150). If i_s=0, the UE monitors the 1st PO; If i_s=1, the UE monitors the 2nd PO; If i_s=2, the UE monitors the 3rd PO; and so on.

5) A UE determines the PDCCH monitoring occasions corresponding to the PO indicated by i_s as follows:

Option 1: The Paging Search Space is configured by the gNB, wherein the searchSpaceId other than zero is configured for the Paging Search Space.

A gNB may signal paging search space configuration (comprising at least one of parameters Monitoring-periodicity-PDCCH-slot, Monitoring-offset-PDCCH-slot, Moni- toring-symbols-PDCCH-within-slot and duration). The UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. The PDCCH monitoring occasions are there in the slots 'x' to x+duration, where the slot with number 'x' in a radio frame with number 'y' satisfies the Equation 3:

$$(y*(\text{number of slots in a radio frame})+x-\text{Monitoring-offset-PDCCH-slot}) \bmod (\text{Monitoring-periodicity-PDCCH-slot})=0; \quad \text{Equation 3}$$

The starting symbol of a PDCCH monitoring occasion in each slot having PDCCH monitoring occasion is given by Monitoring-symbols-PDCCH-within-slot. The length (in symbols) of a PDCCH monitoring occasion is given by the CORESET associated with the search space.

If the paging search space is configured by the gNB, wherein the searchSpaceId other than zero is configured for the Paging Search Space, based on paging search space configuration (comprising at least one of parameters Monitoring-periodicity-PDCCH-slot, Monitoring-offset-PDCCH-slot, Monitoring-symbols-PDCCH-within-slot and duration), the UE knows the PDCCH monitoring occasions for paging in the determined PF and subsequent radio frames. The UE knows the 1st PDCCH monitoring occasion for paging in the determined PF and also the subsequent PDCCH monitoring occasions.

The PDCCH monitoring occasions for paging from the start of the determined PF are sequentially numbered from 0. In other words, the PDCCH monitoring occasions starting from the 1st PDCCH monitoring occasion for paging from the start of the paging frame is sequentially numbered from 0. The maximum number (L) of SSBs per frequency band is pre-defined. The gNB signals the information (SSBPositionsInBurst) related to actual transmitted SSBs in the system information.

A 1st PO is set of X consecutive PDCCH monitoring occasions starting from 0-th PDCCH monitoring occasions for paging. In other words, the 1st PO is a set of 0 to X−1th PDCCH monitoring occasion for paging.

A 2nd PO is set of X consecutive PDCCH monitoring occasions starting from X-th PDCCH monitoring occasions for paging. In other words, the 2nd PO is a set of X to 2X−1th PDCCH monitoring occasion for paging.

A 3rd PO is set of X consecutive PDCCH monitoring occasions starting from 2X-th PDCCH monitoring occasions for paging. In other words, the 3rd PO is a set of 2X to 3X−1th PDCCH monitoring occasion for paging.

An ith PO is set of X consecutive PDCCH monitoring occasions starting from (i*X)-th PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is actual the transmitted SSBs or not can be indicated by the network in the system information.

Alternately, the PDCCH monitoring occasions for paging from the start of the determined PF are sequentially numbered from 1. In other words, the PDCCH monitoring occasions starting from the 1st PDCCH monitoring occasion for paging in the paging frame (or from the start of the PF) is sequentially numbered from 1. The maximum number (L) of SSBs per frequency band is pre-defined. The gNB signals the information (SSBPositionsInBurst) related to actual transmitted SSBs in the system information.

A 1st PO is set of X consecutive PDCCH monitoring occasions starting from the 1st PDCCH monitoring occasions for paging. In other words, the 1st PO is a set of 1 to Xth PDCCH monitoring occasion for paging.

A 2nd PO is set of X consecutive PDCCH monitoring occasions starting from X+1-th PDCCH monitoring occasions for paging. In other words, the 2nd PO is a set of X+1 to 2Xth PDCCH monitoring occasion for paging.

A 3rd PO is set of X consecutive PDCCH monitoring occasions starting from 2X+1-th PDCCH monitoring occasions for paging. In other words, the 3rd PO is a set of 2X+1th to 3Xth PDCCH monitoring occasion for paging.

An ith PO is set of X consecutive PDCCH monitoring occasions starting from [(i−1)*X)]+1-th PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) is sequentially numbered from 0. The first PDCCH monitoring occasion number for each PO can be signaled by the gNB. For example, if Ns is equal to 4, then the i_s values will be 0 to 3 and there are four POs. The gNB can signal the PDCCH monitoring occasion numbers (P, Q, R, S) one corresponding to each of the POs.

A 1st PO is set of X consecutive PDCCH monitoring occasions starting from P-th PDCCH monitoring occasions for paging. In other words, the 1st PO is a set of P to P+X−1th PDCCH monitoring occasion for paging.

A 2nd PO is set of X consecutive PDCCH monitoring occasions starting from Q-th PDCCH monitoring occasions for paging. In other words, the 2nd PO is a set of Q to Q+X−1th PDCCH monitoring occasion for paging.

A 3rd PO is set of X consecutive PDCCH monitoring occasions starting from R-th PDCCH monitoring occasions for paging. In other words, the 3rd PO is a set of R to R+X−1th PDCCH monitoring occasion for paging.

A 4th PO is set of X consecutive PDCCH monitoring occasions starting from S-th PDCCH monitoring occasions for paging and so on. In other words, the 4th PO is a set of S to S+X−1th PDCCH monitoring occasion for paging.

Where X is a number of SSBs. In one embodiment, X is a maximum number of SSBs (i.e., L). In another embodiment, X is equal to the actual transmitted SSBs. In an embodiment, whether X is an actual transmitted SSBs or not can be indicated by the network in the system information.

In an embodiment, each PO can comprise of 'R' sub POs where each sub PO consists of 'X' PDCCH monitoring occasions, X is number of SSBs; in one embodiment X is maximum number of SSBs i.e. L; in another embodiment X is equal to actual transmitted SSBs. The number of sub POs i.e. R is also signaled by gNB. In its PO (identified by PO index) UE may monitor one or more sub POs. The starting PDCCH monitoring occasion number of each of these sub POs of a PO is signaled by gNB. Alternately, an offset 'O' can be signaled between the sub POs. The starting PDCCH occasions number of $1^{st}$ sub PO is the starting PDCCH occasions number of PO. Let's say starting PDCCH monitoring occasion number of PO is P and offset is O. $1^{st}$ sub PO is a set of X consecutive PDCCH monitoring occasions starting from Pth PDCCH monitoring occasions for paging. $2^{nd}$ sub PO is a set of X consecutive PDCCH monitoring occasions starting from (P+X+O)th PDCCH monitoring occasion for paging. $3^{rd}$ sub PO is a set of X consecutive PDCCH monitoring occasions starting from (P+2X+2O)th PDCCH monitoring occasion for paging and so on. Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) is sequentially numbered from 0. The first PDCCH monitoring occasion number for a first PO can be signaled by the gNB. The gNB can also signal an offset between the starting PDCCH monitoring occasion of each PO. For example, if Ns is equal to 4, then the i_s values will be 0 to 3 and there are four POs. The gNB can signal the PDCCH monitoring occasion number (P) of the first PO and an offset 0.

A 1st PO is set of X consecutive PDCCH monitoring occasions starting from P-th PDCCH monitoring occasions for paging.

A 2nd PO is set of X consecutive PDCCH monitoring occasions starting from (P+O)-th PDCCH monitoring occasions for paging.

A 3rd PO is set of X consecutive PDCCH monitoring occasions starting from (P+2O)-th PDCCH monitoring occasions for paging.

A 4th PO is set of X consecutive PDCCH monitoring occasions starting from (P+3O)-th PDCCH monitoring occasions for paging and so on.

Where X is a number of SSBs. In one embodiment, X is a maximum number of SSBs (i.e., L). In another embodiment, X is equal to the actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) is sequentially numbered from 0. The first PDCCH monitoring occasion number for a first PO can be signaled by the gNB. The gNB can also signal an offset between the last PDCCH monitoring occasion of a PO and the starting PDCCH monitoring occasion of the next PO. For example, if Ns is equal to 4, then the i_s values will be 0 to 3 and there are four POs. The gNB can signal the PDCCH monitoring occasion number (P) of first the PO and an offset 0.

A 1st PO is set of X consecutive PDCCH monitoring occasions starting from P-th PDCCH monitoring occasions for paging.

A 2nd PO is set of X consecutive PDCCH monitoring occasions starting from (P+X+O)-th PDCCH monitoring occasions for paging.

A 3rd PO is set of X consecutive PDCCH monitoring occasions starting from (P+2X+2O)-th PDCCH monitoring occasions for paging.

A 4th PO is set of X consecutive PDCCH monitoring occasions starting from (P+3X+3O)-th PDCCH monitoring occasions for paging and so on.

Where X is a number of SSBs. In one embodiment, X is a maximum number of SSBs (i.e., L). In another embodiment, X is equal to the actual transmitted SSBs. In an embodiment, whether X is actual transmitted SSBs or not can be indicated by the network in the system information.

Alternately, the slot index for a first PO can be signaled by the gNB. The gNB can also signal an offset between the starting slot of each PO. For example, if Ns is equal to 4, then the i_s values will be 0 to 3 and there are four POs. The gNB can signal slot index (S) of the first PO and an offset O.

A 1st PO is set of X consecutive PDCCH monitoring occasions starting from the 1st PDCCH monitoring occasion in slot S of a paging frame;

A 2nd PO is set of X consecutive PDCCH monitoring occasions starting from the 1st PDCCH monitoring occasion in slot S+O;

A 3rd PO is set of X consecutive PDCCH monitoring occasions starting from the 1st PDCCH monitoring occasion in slot S+2O;

A 4th PO is set of X consecutive PDCCH monitoring occasions starting from the 1st PDCCH monitoring occasion in slot S+3O and so on.

Where X is a number of SSBs. In one embodiment X is a maximum number of SSBs (i.e., L). In another embodiment X is equal to actual transmitted SSBs. In an embodiment whether X is the actual transmitted SSBs or not can be indicated by the network in the system information.

Option 2: The Paging search space is configured by the gNB, wherein the searchSpaceId zero is configured for the Paging Search Space.

The UE determines the RMSI pattern from the RMSI configuration signaled by the gNB.

If RMSI pattern is 2 or 3
A 1st PO is the set of PDCCH monitoring occasions for the RMSI in a 1st half frame of the determined PF
A 2nd PO is the set of PDCCH monitoring occasions for the RMSI in a 2nd half frame of the determined PF
If RMSI pattern is 1
A 1st PO is the set of PDCCH monitoring occasions for an RMSI, wherein the 1st PDCCH monitoring occasion starts in the determined PF.

Option 3: If the paging search space is configured by the gNB, wherein the searchSpaceId zero is configured for the Paging Search Space.

If the paging search space with search space Id zero is configured by the gNB, PDCCH monitoring occasions for paging are same as PDCCH monitoring occasions for the RMSI. Based on the RMSI configuration, the UE knows the PDCCH monitoring occasions for paging in the determined PF and subsequent radio frames. The UE knows the 1st PDCCH monitoring occasion for paging in the PF and also the subsequent PDCCH monitoring occasions for paging.

PDCCH monitoring occasions starting from the 1st PDCCH monitoring occasion for paging in the paging frame (or from the start of the PF) are sequentially numbered from 0.

A 1st PO is set of X consecutive PDCCH monitoring occasions starting from 0-th PDCCH monitoring occasions for paging.

A 2nd PO is set of X consecutive PDCCH monitoring occasions starting from X-th PDCCH monitoring occasions for paging.

A 3rd PO is set of X consecutive PDCCH monitoring occasions starting from 2X-th PDCCH monitoring occasions for paging.

An ith PO is set of X consecutive PDCCH monitoring occasions starting from (i*X)-th PDCCH monitoring occasions for paging and so on.

Where X is a number of SSBs. In one embodiment, X is a maximum number of SSBs (i.e., L). In another embodiment, X is equal to the actual transmitted SSBs. In an embodiment, whether X is the actual transmitted SSBs or not can be indicated by the network in the system information.

Alternately, the PDCCH monitoring occasions starting from the 1st PDCCH monitoring occasion for paging in the paging frame (or from the start of the PF) is sequentially numbered from 1.

A 1st PO is set of X consecutive PDCCH monitoring occasions starting from the 1st PDCCH monitoring occasions for paging.

A 2nd PO is set of X consecutive PDCCH monitoring occasions starting from X+1-th PDCCH monitoring occasions for paging.

A 3rd PO is set of X consecutive PDCCH monitoring occasions starting from 2X+1-th PDCCH monitoring occasions for paging.

An ith PO is set of X consecutive PDCCH monitoring occasions starting from [(i−1)*X)]+1-th PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 4: Subframes or slots corresponding to each PO is pre-defined as in LTE.

Embodiment 2

Figure 2:
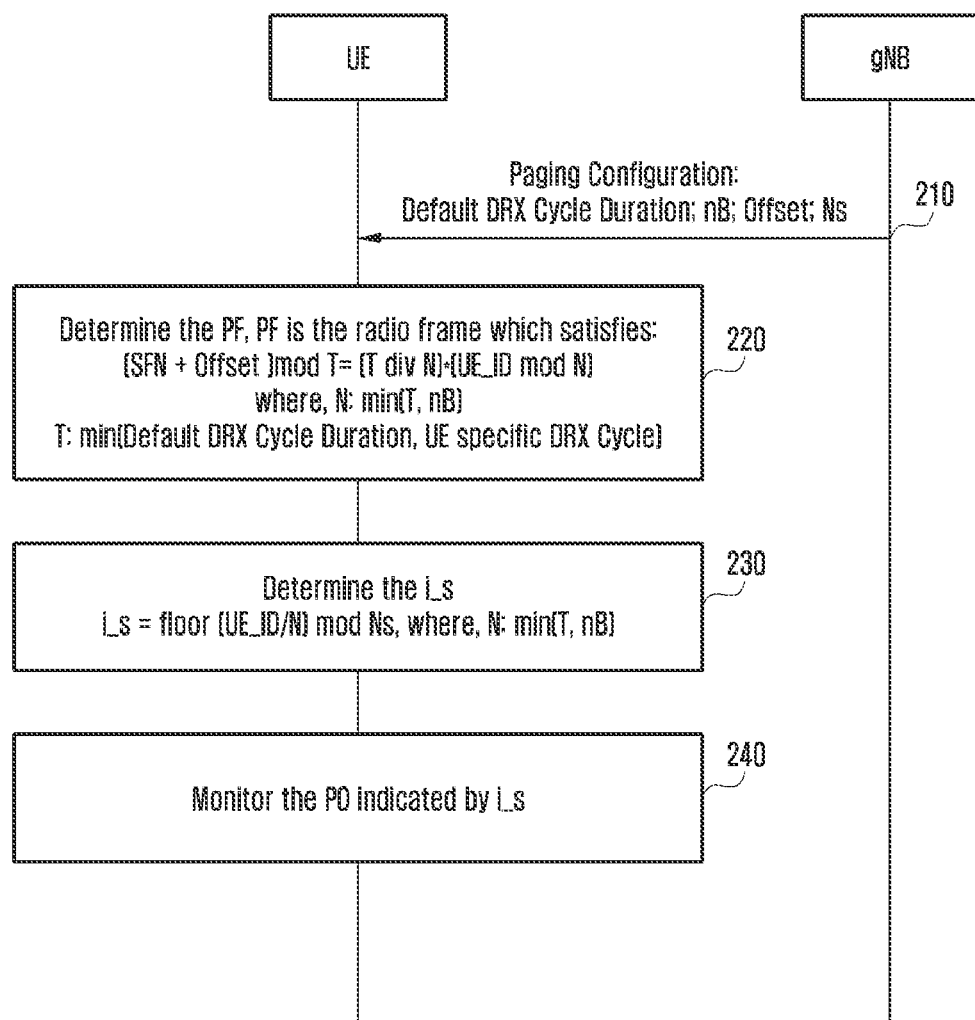
FIG. 2 illustrates another example of determining PO according to an embodiment of the disclosure.

FIG. 2 illustrates another example of determining PO according to an embodiment of the disclosure.

Referring to FIG. 2:

0) The UE acquires the paging configuration (Default DRX Cycle Duration, nB, Ns, Offset), paging search space configuration (if signaled by the network) and an RMSI configuration (RMSI search space, RMSI pattern info: Pattern 1, 2, 3) from the system information signaled by the network (210). RMSI is also be referred as SIB1. RMSI pattern is also referred as SS/PBCH block and CORESET multiplexing p pattern. In the RRC Connected State, the paging search space configuration is signaled by the network for one or more configured BWP(s) in dedicated signaling and the UE uses the paging search space configuration of its active DL BWP.

1) The UE first derives a Paging frame (220). The paging frame is the radio frame with SFN which satisfies following Equation 4:

$$(SFN+\text{offset}) \mod T = (T \div N)*(UE\_ID \mod N) \quad \text{Equation 4}$$

Where,

T: DRX cycle of the UE. T is determined by the shortest of the UE specific DRX values, if configured by the RRC or by the upper layers (e.g. NAS), and a default DRX value signaled in the system information. If the UE specific DRX is not configured by the RRC or by the upper layers, the default value is applied.

nB: nB is the number of paging frames in DRX cycle. nB is signaled by the gNB in the system information. The values of nB can be T, T/2, T/4, T/8, T/16, T/32 and so on. It is to be noted that in legacy system nB is the number of POs in DRX cycle.

N; min(T, nB)

In an example, the UE_ID can be {IMSI mod 1024} or {5G-S-TMSI mod 1024}.

The paging frame is the radio frame with respect to which the UE determines its PO. A PO associated with a PF may start in the PF or after the PF. A PO which starts in the paging frame may end in the subsequent radio frame.

The POs other than the first PO may start in the subsequent radio frame or in a paging frame.

2) The UE then calculates an index i_s (230), where i_s is derived from the following Equation 5:

$$i\_s = \text{floor}(UE\_ID/N) \bmod Ns, \text{ where} \quad \text{Equation 5}$$

Ns: Ns*nB indicates the total number of POs in DRX cycle. Ns is the number of POs corresponding to or associated with a PF. The parameter Ns is signaled by the gNB in the system information.

N; min(T, nB)

In an example, the UE_ID can be IMSI mod 1024.

3) The UE monitors the PO indicated by i_s (240). If i_s=0, the UE monitors the 1st PO; If i_s=1, the UE monitors the 2nd PO; If i_s=2, the UE monitors the 3rd PO; and so on.

4) The UE determines the PDCCH monitoring occasions corresponding to the PO indicated by i_s as follows:

Option 1: The Paging Search Space is configured by the gNB, wherein the searchSpaceId other than zero is configured for the Paging Search Space.

The gNB may signal paging search space configuration (comprising at least one of parameters Monitoring-periodicity-PDCCH-slot, Monitoring-offset-PDCCH-slot, Monitoring-symbols-PDCCH-within-slot and duration). The UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. The PDCCH monitoring occasions are there in the slots 'x' to x+duration, where the slot with number 'x' in a radio frame with number 'y' satisfies the Equation 6:

$$(y*(\text{number of slots in a radio frame})+x-\text{Monitoring-offset-PDCCH-slot}) \bmod (\text{Monitoring-periodicity-PDCCH-slot})=0; \quad \text{Equation 6}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space.

If the paging search space is configured by the gNB, wherein the searchSpaceId other than zero is configured for the Paging Search Space, based on the paging search space configuration (comprising at least one of parameters Monitoring-periodicity-PDCCH-slot, Monitoring-offset-PDCCH-slot, Monitoring-symbols-PDCCH-within-slot and duration), the UE knows the PDCCH monitoring occasions for paging in the determined PF and subsequent radio frames. The UE knows the 1st PDCCH monitoring occasion for paging in the determined PF and also the subsequent PDCCH monitoring occasions.

The PDCCH monitoring occasions for paging from the start of the determined PF are sequentially numbered from 0. In other words, the PDCCH monitoring occasions starting from the 1st PDCCH monitoring occasion for paging in the paging frame (or from start of the PF) are sequentially numbered from 0. The maximum number (L) of SSBs per frequency band is pre-defined. The gNB signals the information (SSBPositionsInBurst) related to actual transmitted SSBs in the system information.

A 1st PO is set of X consecutive PDCCH monitoring occasions starting from 0-th PDCCH monitoring occasions for paging. In other words, the 1st PO is a set of 0 to X−1th PDCCH monitoring occasion for paging.

A 2nd PO is set of X consecutive PDCCH monitoring occasions starting from X-th PDCCH monitoring occasions for paging. In other words, the 2nd PO is a set of X to 2X−1th PDCCH monitoring occasion for paging.

A 3rd PO is set of X consecutive PDCCH monitoring occasions starting from 2X-th PDCCH monitoring occasions for paging. In other words, the 3rd PO is a set of 2X to 3X−1th PDCCH monitoring occasion for paging.

An ith PO is set of X consecutive PDCCH monitoring occasions starting from (i*X)-th PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 1. In other words, the PDCCH monitoring occasions starting from the 1st PDCCH monitoring occasion for paging in the paging frame (or from start of the PF) is sequentially numbered from 1. The maximum number (L) of SSBs per frequency band is pre-defined. The gNB signals the information (SSBPositionsInBurst) related to the actual transmitted SSBs in the system information.

A 1st PO is set of X consecutive PDCCH monitoring occasions starting from the 1st PDCCH monitoring occasions for paging. In other words, the 1st PO is a set of 1 to Xth PDCCH monitoring occasion for paging.

A 2nd PO is set of X consecutive PDCCH monitoring occasions starting from X+1-th PDCCH monitoring occasions for paging. In other words, the 2nd PO is a set of X+1 to 2Xth PDCCH monitoring occasion for paging.

A 3rd PO is set of X consecutive PDCCH monitoring occasions starting from 2X+1-th PDCCH monitoring occasions for paging. In other words, the 3rd PO is a set of 2X+1th to 3Xth PDCCH monitoring occasion for paging.

An ith PO is set of X consecutive PDCCH monitoring occasions starting from [(i−1)*X)]+1-th PDCCH monitoring occasions for paging and so on.

Where X is number of SSBs. In one embodiment, X is a maximum number of SSBs (i.e., L). In another embodiment, X is equal to an actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the PF) is sequentially numbered from 0. The first PDCCH monitoring occasion number for each PO can be signaled by the gNB. For example, if Ns is equal to 4, then the i_s values will be 0 to 3 and there are four POs. The gNB can signal the PDCCH monitoring occasion numbers (P, Q, R, S) one corresponding to each of the POs.

A 1st PO is set of X consecutive PDCCH monitoring occasions starting from P-th PDCCH monitoring occasions for paging.

A 2nd PO is set of X consecutive PDCCH monitoring occasions starting from Q-th PDCCH monitoring occasions for paging.

A 3rd PO is set of X consecutive PDCCH monitoring occasions starting from R-th PDCCH monitoring occasions for paging.

A 4th PO is set of X consecutive PDCCH monitoring occasions starting from S-th PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information. In an embodiment, each PO can comprise of 'R' sub POs where each sub PO consists of 'X' PDCCH monitoring occasions, X is number of SSBs; in one embodiment X is maximum number of SSBs i.e. L; in another embodiment X is equal to actual transmitted SSBs. The number of sub POs i.e. R is also signaled by gNB. In its PO (identified by PO index) UE may monitor one or more sub POs. The starting PDCCH monitoring occasion number of each of these sub POs of a PO is signaled by gNB. Alternately, an offset 'O' can be signaled between the sub POs. The starting PDCCH occasions number of $1^{st}$ sub PO is the starting PDCCH occasions number of PO. Let's say starting PDCCH monitoring occasion number of PO is P and offset is O. $1^{st}$ sub PO is a set of X consecutive PDCCH monitoring occasions starting from Pth PDCCH monitoring occasions for paging. $2^{nd}$ sub PO is a set of X consecutive PDCCH monitoring occasions starting from (P+X+O)th PDCCH monitoring occasion for paging. 3rd sub PO is a set of X consecutive PDCCH monitoring occasions starting from (P+2X+2O)th PDCCH monitoring occasion for paging and so on.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the PF) is sequentially numbered from 0. The first PDCCH monitoring occasion number for the first PO can be signaled by the gNB. The gNB can also signal an offset between the starting PDCCH monitoring occasion of each PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-th PDCCH monitoring occasions for paging.

A 2nd PO is set of X consecutive PDCCH monitoring occasions starting from (P+O)-th PDCCH monitoring occasions for paging.

A 3rd PO is set of X consecutive PDCCH monitoring occasions starting from (P+2O)-th PDCCH monitoring occasions for paging.

A 4th PO is set of X consecutive PDCCH monitoring occasions starting from (P+3O)-th PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the PF) is sequentially numbered from 0. The first PDCCH monitoring occasion number for the first PO can be signaled by the gNB. The gNB can also signal an offset between last PDCCH monitoring occasion of a PO and starting PDCCH monitoring occasion of the next PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-th PDCCH monitoring occasions for paging.

A 2nd PO is set of X consecutive PDCCH monitoring occasions starting from (P+X+O)-th PDCCH monitoring occasions for paging;

A 3rd PO is set of X consecutive PDCCH monitoring occasions starting from (P+2X+2O)-th PDCCH monitoring occasions for paging;

A 4th PO is set of X consecutive PDCCH monitoring occasions starting from (P+3X+3O)-th PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the slot index for the first PO can be signaled by the gNB. The gNB can also signal an offset between the starting slot of each PO. For example, if Ns is equal to 4, then the i_s values will be 0 to 3 and there are four POs. The gNB can signal slot index (S) of the first PO and an offset O.

A 1st PO is set of X consecutive PDCCH monitoring occasions starting from the 1st PDCCH monitoring occasion in slot S of a paging frame.

A 2nd PO is set of X consecutive PDCCH monitoring occasions starting from the 1st PDCCH monitoring occasion in slot S+O.

A 3rd PO is set of X consecutive PDCCH monitoring occasions starting from the 1st PDCCH monitoring occasion in slot S+2O.

A 4th PO is set of X consecutive PDCCH monitoring occasions starting from the 1st PDCCH monitoring occasion in slot S+3O and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 2: The Paging search space is configured by the gNB, wherein the searchSpaceId zero is configured for the Paging Search Space The UE determines the RMSI pattern from the RMSI configuration signaled by the gNB.

If RMSI pattern is 2 or 3

A 1st PO is the set of PDCCH monitoring occasions for the RMSI in a 1st half frame of the determined PF, and A 2nd PO is the set of PDCCH monitoring occasions for the RMSI in a 2nd half frame of the determined PF If RMSI pattern is 1, A 1st PO is the set of PDCCH monitoring occasions for the RMSI, wherein the 1st PDCCH monitoring occasion starts in the determined PF.

Option 3: The Paging search space is configured by the gNB, wherein the searchSpaceId zero is configured for the Paging Search Space If the paging search space with search space Id zero is configured by the gNB, PDCCH monitoring occasions for paging are the same as PDCCH monitoring occasions for the RMSI. Based on the RMSI configuration, the UE knows the PDCCH monitoring occasions for paging in the determined PF and subsequent radio frames. The UE knows the 1st PDCCH monitoring occasion for paging in the PF and also the subsequent PDCCH monitoring occasions for paging.

The PDCCH monitoring occasions starting from the 1st PDCCH monitoring occasion for paging in the paging frame is sequentially numbered from 0.

A 1st PO is set of X consecutive PDCCH monitoring occasions starting from 0-th PDCCH monitoring occasions for paging.

A 2nd PO is set of X consecutive PDCCH monitoring occasions starting from X-th PDCCH monitoring occasions for paging.

A 3rd PO is set of X consecutive PDCCH monitoring occasions starting from 2X-th PDCCH monitoring occasions for paging and so on.

An ith PO is set of X consecutive PDCCH monitoring occasions starting from (i*X)-th PDCCH monitoring occasions for paging Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions starting from the 1st PDCCH monitoring occasion for paging in the paging frame (or from the start of the PF) is sequentially numbered from 1.

A 1st PO is set of X consecutive PDCCH monitoring occasions starting from the 1st PDCCH monitoring occasions for paging.

A 2nd PO is set of X consecutive PDCCH monitoring occasions starting from X+1-th PDCCH monitoring occasions for paging.

A 3rd PO is set of X consecutive PDCCH monitoring occasions starting from 2X+1-th PDCCH monitoring occasions for paging and so on.

An ith PO is set of X consecutive PDCCH monitoring occasions starting from [(i−1)*X)]+1-th PDCCH monitoring occasions for paging Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 4: Subframes or slots corresponding to each PO is pre-defined as in LTE.

Embodiment 3

Figure 3:
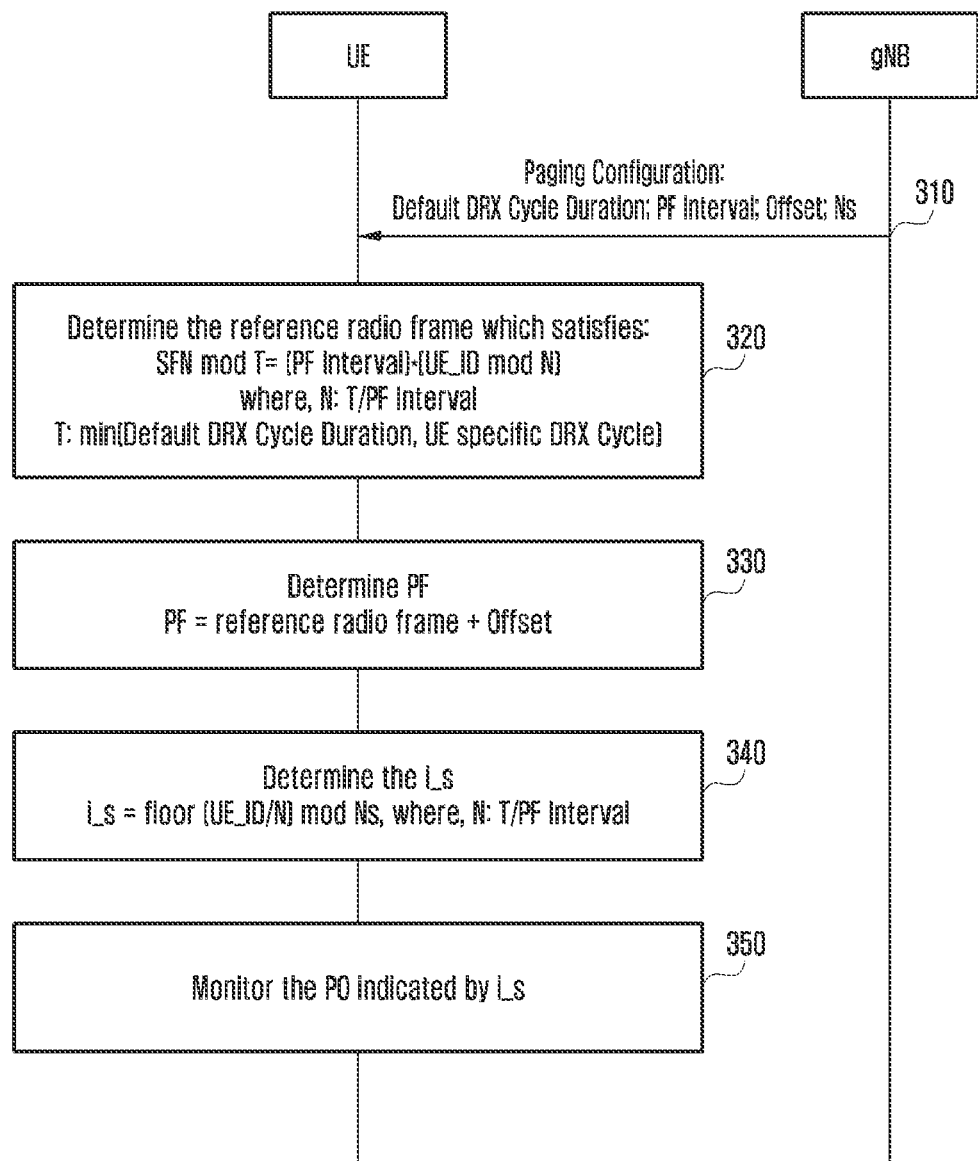
FIG. 3 illustrates another example of determining PO according to an embodiment of the disclosure.

FIG. 3 illustrates another example of determining a PO according to an embodiment of the disclosure.

Referring to FIG. 3:

0) A UE acquires the paging configuration (Default DRX Cycle Duration, PF Interval, Ns, Offset), paging search space configuration (if signaled by the network) and an RMSI configuration (a RMSI search space, a RMSI pattern info: Pattern 1, 2, 3) from the system information signaled by the network (310). The RMSI is also be referred as SIB1. The RMSI pattern is also referred as SS/PBCH block and CORESET multiplexing pattern. In the RRC Connected State, the paging search space configuration is signaled by the network for one or more configured BWP(s) in dedicated signaling and the UE uses the paging search space configuration of its active DL BWP.

1) The UE first derives a reference radio frame (320). The reference frame is the radio frame with the SFN which satisfies following Equation 7:

$$\text{SFN mod } T = (\text{PF Interval}) * (\text{UE\_ID mod } N) \quad \text{Equation 7}$$

Where,

T: DRX cycle of the UE. T is determined by the shortest of the UE specific DRX values, if configured by the RRC or by upper layers (e.g. NAS), and a default DRX value signaled in the system information. If the UE specific DRX is not configured by the RRC or by upper layers, the default value is applied.

A PF Interval: Interval at which a PF is present in the DRX cycle. The PF interval is signaled by the gNB in the system information. The unit of the PF interval is in the radio frame.

N: T/PF Interval

In an example, the UE_ID can be {IMSI mod 1024} or {5G-S-TMSI mod 1024}.

2) The UE then determines the paging frame where the paging frame is the radio frame having the SFN equal to 'SFN of reference frame+offset'. The Parameter Offset is signalled by the gNB in the system information (330). The offset is in units of the radio frames.

For example, if the determined reference frame is SFN 'X' and the offset signalled by the network is 'Y', the paging frame is the radio frame were the SFN equals X+Y.

The paging frame is the radio frame with respect to which the UE determines the PO. A PO associated with a PF may start in the PF or after the PF. A PO which starts in a paging frame may end in a subsequent radio frame. The UE then calculates an index i_s (340), where i_s is derived from the following Equation 8:

$$i\_s = \text{floor}(\text{UE\_ID}/N) \bmod Ns, \text{ where} \quad \text{Equation 8}$$

Ns: Number of POs corresponding to or associated with a PF. Ns*N indicates the total number of POs in DRX cycle. The parameter Ns is signaled by the gNB in the system information.

N: T/PF Interval

In an example, the UE_ID can be {IMSI mod 1024} or {5G-S-TMSI mod 1024}.

The UE monitors the PO indicated by i_s (350). If i_s=0, the UE monitors the 1st PO; If i_s=1, the UE monitors the 2nd PO; If i_s=2, the UE monitors the 3rd PO; and so on . . . .

The UE determines the PDCCH monitoring occasions corresponding to the PO indicated by i_s as follows:

Option 1: the Paging Search Space is configured by the gNB, wherein the searchSpaceId other than zero is configured for the Paging Search Space.

The gNB may signal paging search space configuration (comprising at least one of parameters Monitoring-periodicity-PDCCH-slot, Monitoring-offset-PDCCH-slot, Monitoring-symbols-PDCCH-within-slot and duration). The UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. The PDCCH monitoring occasions are there in the slots 'x' to x+duration, where the slot with number 'x' in a radio frame with number 'y' satisfies the Equation 9:

$$(y*(\text{number of slots in a radio frame})+x-\text{Monitoring-offset-PDCCH-slot}) \bmod (\text{Monitoring-periodicity-PDCCH-slot})=0; \quad \text{Equation 9}$$

The starting symbol of a PDCCH monitoring occasion in each slot having the PDCCH monitoring occasion is given by Monitoring-symbols-PDCCH-within-slot. The length (in symbols) of a PDCCH monitoring occasion is given in the corset associated with the search space.

If the paging search space is configured by the gNB, wherein the searchSpaceId other than zero is configured for the Paging Search Space, based on paging search space configuration (comprising at least one of parameters Monitoring-periodicity-PDCCH-slot, Monitoring-offset-PDCCH-slot, Monitoring-symbols-PDCCH-within-slot and duration), the UE knows the PDCCH monitoring occasions for paging in the determined PF and subsequent radio frames. The UE knows the 1st PDCCH monitoring occasion for paging in the determined PF and also the subsequent PDCCH monitoring occasions. It is to be noted that in case of TDD cell, amongst PDCCH monitoring occasions configured by paging search space, PDCCH monitoring occasions which are not overlapping with UL symbols are considered as valid PDCCH monitoring occasions for paging. These valid PDCCH monitoring occasions for paging are referred as PDCCH monitoring occasions for paging in further description.

The PDCCH monitoring occasions starting from the 1st PDCCH monitoring occasion for paging in the paging frame is sequentially numbered from 0. The maximum number (L) of SSBs per frequency band is pre-defined. The gNB signals the information (SSBPositionsInBurst) related to actual transmitted SSBs in the system information.

A 1st PO is set of X consecutive PDCCH monitoring occasions starting from $0^{th}$ PDCCH monitoring occasions for paging.

A 2nd PO is set of X consecutive PDCCH monitoring occasions starting from X-$^{th}$ PDCCH monitoring occasions for paging.

A 3rd PO is set of X consecutive PDCCH monitoring occasions starting from 2X-$^{th}$ PDCCH monitoring occasions for paging.

An ith PO is set of X consecutive PDCCH monitoring occasions starting from (i*X)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 1. In other words, the PDCCH monitoring occasions starting from the 1st PDCCH monitoring occasion for paging in the paging frame (or from the start of the PF) is sequentially numbered from 1. The maximum number (L) of SSBs per frequency band is pre-defined. The gNB signals the information (SSBPositionsInBurst) related to the actual transmitted SSBs in the system information.

A 1st PO is set of X consecutive PDCCH monitoring occasions starting from the $1^{st}$ PDCCH monitoring occasions for paging.

A 2nd PO is set of X consecutive PDCCH monitoring occasions starting from X+1-$^{th}$ PDCCH monitoring occasions for paging.

A 3rd PO is set of X consecutive PDCCH monitoring occasions starting from 2X+1-$^{th}$ PDCCH monitoring occasions for paging.

An ith PO is set of X consecutive PDCCH monitoring occasions starting from [(i−1)*X)]+1$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) is sequentially numbered from 0. The first PDCCH monitoring occasion number for each PO can be signaled by the gNB. For example, if Ns is equal to 4, then the i_s values will be 0 to 3 and there are four POs. The gNB can signal the PDCCH monitoring occasion numbers (P, Q, R, S) one corresponding to each of the POs.

A 1st PO is set of X consecutive PDCCH monitoring occasions starting from P-$^{th}$ PDCCH monitoring occasions for paging.

A 2nd PO is set of X consecutive PDCCH monitoring occasions starting from Q-$^{th}$ PDCCH monitoring occasions for paging.

A 3rd PO is set of X consecutive PDCCH monitoring occasions starting from R-$^{th}$ PDCCH monitoring occasions for paging.

A $4^{th}$ PO is set of X consecutive PDCCH monitoring occasions starting from S-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information. In an embodiment, each PO can comprise of 'R' sub POs where each sub PO consists of 'X' PDCCH monitoring occasions, X is number of SSBs; in one embodiment X is maximum number of SSBs i.e. L; in another embodiment X is equal to actual transmitted SSBs. The number of sub POs i.e. R is also signaled by gNB. In its PO (identified by PO index) UE may monitor one or more sub POs. The starting PDCCH monitoring occasion number of each of these sub POs of a PO is signaled by gNB. Alternately, an offset 'O' can be signaled between the sub POs. The starting PDCCH occasions number of $1^{st}$ sub PO is the starting PDCCH occasions number of PO. Let's say starting PDCCH monitoring occasion number of PO is P and offset is O. $1^{st}$ sub PO is a set of X consecutive PDCCH monitoring occasions starting from Pth PDCCH monitoring occasions for paging. $2^{nd}$ sub PO is a set of X consecutive PDCCH monitoring occasions starting from (P+X+O)th PDCCH monitoring occasion for paging. $3^{rd}$ sub PO is a set of X consecutive PDCCH monitoring occasions starting from (P+2X+2O)th PDCCH monitoring occasion for paging and so on.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame is sequentially numbered from 0. The first PDCCH monitoring occasion number for the first PO can be signaled by the gNB. The gNB can also signal an offset between the starting PDCCH monitoring occasion of each PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+O)-$^{th}$ PDCCH monitoring occasions for paging.

A 3rd PO is set of X consecutive PDCCH monitoring occasions starting from (P+2O)-$^{th}$ PDCCH monitoring occasions for paging.

A 4$^{th}$ PO is set of X consecutive PDCCH monitoring occasions starting from (P+3O)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) is sequentially numbered from 0. The first PDCCH monitoring occasion number for the first PO can be signaled by the gNB. The gNB can also signal an offset between a last PDCCH monitoring occasion of a PO and starting PDCCH monitoring occasion of a next PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+X+O)-$^{th}$ PDCCH monitoring occasions for paging.

A 3rd PO is set of X consecutive PDCCH monitoring occasions starting from (P+2X+2O)-$^{th}$ PDCCH monitoring occasions for paging.

A 4th PO is set of X consecutive PDCCH monitoring occasions starting from (P+3X+3O)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the slot index for the first PO can be signaled by the gNB. The gNB can also signal an offset between the starting slot of each PO. For example, if Ns is equal to 4, then the i_s values will be 0 to 3 and there are four POs. The gNB can signal slot index (S) of the first PO and an offset O.

A 1st PO is set of X consecutive PDCCH monitoring occasions starting from the 1$^{st}$ PDCCH monitoring occasion in slot S of the paging frame.

A 2nd PO is set of X consecutive PDCCH monitoring occasions starting from the 1$^{st}$ PDCCH monitoring occasion in slot S+O.

A 3rd PO is set of X consecutive PDCCH monitoring occasions starting from the 1$^{st}$ PDCCH monitoring occasion in slot S+2O.

A 4$^{th}$ PO is set of X consecutive PDCCH monitoring occasions starting from the 1$^{st}$ PDCCH monitoring occasion in slot S+3O and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 2: The Paging search space is configured by the gNB, wherein the searchSpaceId zero is configured for the Paging Search Space The UE determines the RMSI pattern from the RMSI configuration signaled by the gNB.

If the RMSI pattern is 2 or 3

A 1$^{st}$ PO is the set of PDCCH monitoring occasions for the RMSI in a 1$^{st}$ half frame of the determined PF, and A 2$^{nd}$ PO is the set of PDCCH monitoring occasions for the RMSI in a 2$^{nd}$ half frame of the determined PF.

If RMSI pattern is 1

A 1$^{st}$ PO is the set of PDCCH monitoring occasions for the RMSI, wherein the 1$^{st}$ PDCCH monitoring occasion starts in the determined PF.

Option 3: The paging search space is configured by the gNB, wherein the searchSpaceId zero is configured for the Paging Search Space.

If the paging search space is not configured by the gNB, the PDCCH monitoring occasions for paging are the same as the PDCCH monitoring occasions for the RMSI. Based on the RMSI configuration, the UE knows the PDCCH monitoring occasions for paging in the determined PF and subsequent radio frames. The UE knows the 1st PDCCH monitoring occasion for paging in the PF and also the subsequent PDCCH monitoring occasions for paging.

The PDCCH monitoring occasions starting from the 1st PDCCH monitoring occasion for paging in the paging frame is sequentially numbered from 0.

A 1st PO is set of X consecutive PDCCH monitoring occasions starting from 0$^{th}$ PDCCH monitoring occasions for paging.

A 2nd PO is set of X consecutive PDCCH monitoring occasions starting from X-$^{th}$ PDCCH monitoring occasions for paging.

A 3rd PO is set of X consecutive PDCCH monitoring occasions starting from 2X-$^{th}$ PDCCH monitoring occasions for paging.

An ith PO is set of X consecutive PDCCH monitoring occasions starting from (i*X)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions starting from the 1st PDCCH monitoring occasion for paging in the paging frame (or from the start of the PF) is sequentially numbered from 1.

A 1st PO is set of X consecutive PDCCH monitoring occasions starting from the 1$^{st}$ PDCCH monitoring occasions for paging.

A 2nd PO is set of X consecutive PDCCH monitoring occasions starting from X+1-$^{th}$ PDCCH monitoring occasions for paging.

A 3rd PO is set of X consecutive PDCCH monitoring occasions starting from 2X+1-$^{th}$ PDCCH monitoring occasions for paging.

An ith PO is set of X consecutive PDCCH monitoring occasions starting from [(i−1)*X)]+1-$^{th}$ PDCCH monitoring occasions for paging and so on.

Where X is a number of SSBs. In one embodiment, X is maximum number of SSBs (i.e., L). In another embodiment, X is equal to actual transmitted SSBs. In an embodiment, whether X is the actual transmitted SSBs or not can be indicated by the network in the system information.

Option 4: Subframes or slots corresponding to each PO are pre-defined as in LTE.

Embodiment 4

Figure 4:
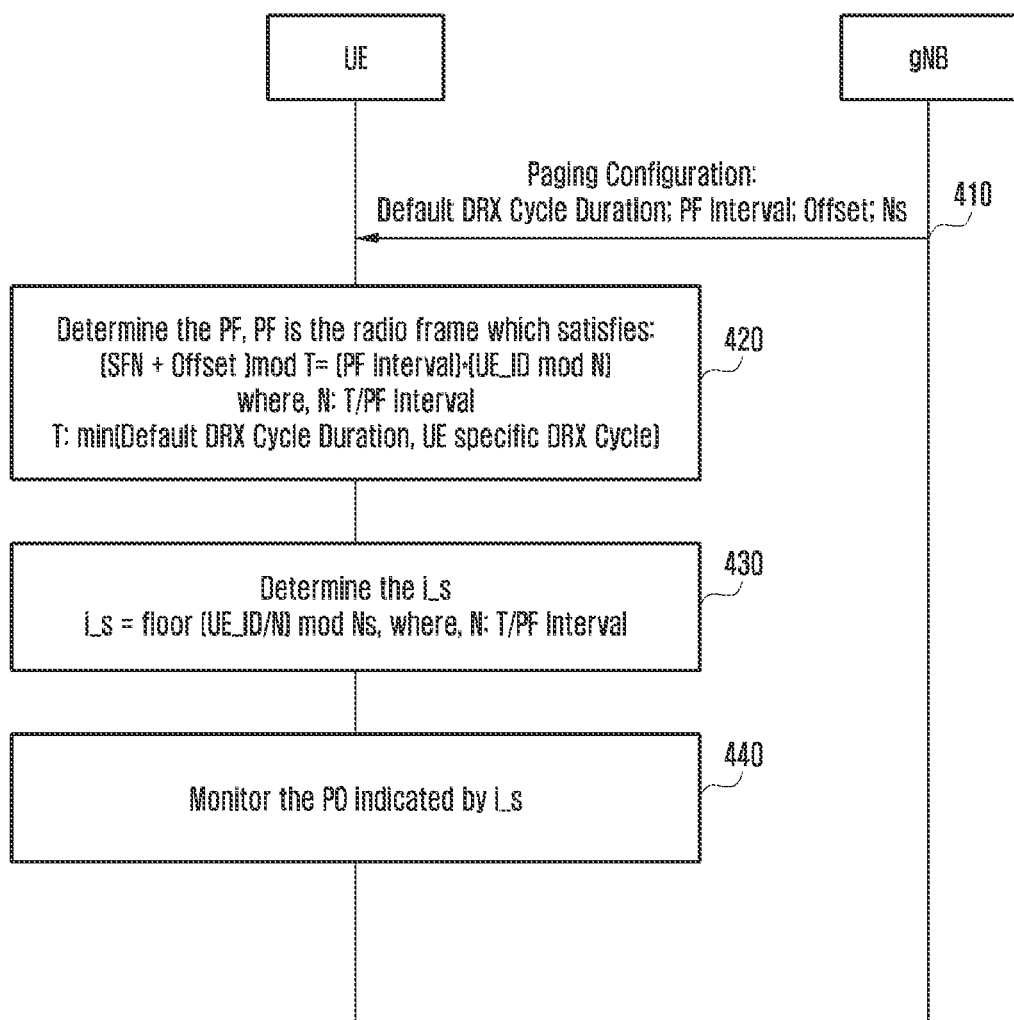
FIG. 4 illustrates another example of determining PO according to an embodiment of the disclosure.

FIG. 4 illustrates another example of determining PO according to an embodiment of the disclosure.

Referring to FIG. 4:

0) The UE acquires the paging configuration (Default DRX Cycle Duration, PF Interval, Ns, Offset), the paging search space configuration (if signaled by the network) and the RMSI configuration (RMSI search space, RMSI pattern info: Pattern 1, 2, 3) from the system information signaled by the network (410). The RMSI is also be referred as SIB1. The RMSI pattern is also referred as the SS/PBCH block and the CORESET multiplexing pattern. In the RRC Connected State, the paging search space configuration is signaled by the network for one or more configured BWP(s) in dedicated signaling and the UE uses the paging search space configuration of its active DL BWP.

1) The UE first derives a Paging frame (420). The paging frame is the radio frame with an SFN which satisfies the following Equation 10:

$$(SFN+offset) \bmod T = (PF\ Interval) * (UE\_ID \bmod N) \quad \text{Equation 10}$$

Where,

T: DRX cycle of the UE. T is determined by the shortest of the UE specific DRX values, if configured by the RRC or by the upper layers (e.g. NAS), and a default DRX value signaled in the system information. If the UE specific DRX is not configured by the RRC or by the upper layers, the default value is applied.

PF Interval: Interval at which the PF is present in the DRX cycle. The PF interval is signaled by the gNB in the system information. The unit of the PF interval is in a radio frame.

N: T/PF Interval

In an example, the UE_ID can be {IMSI mod 1024} or {5G-S-TMSI mod 1024}.

The paging frame is the radio frame with respect to which the UE determines its PO. A PO associated with a PF may start in the PF or after the PF. A PO which starts in the paging frame may end in a subsequent radio frame.

2) The UE then calculates an index i_s (430), where i_s is derived from the following Equation 11:

$$i\_s = \text{floor}(UE\_ID/N) \bmod Ns, \text{ where} \quad \text{Equation 11}$$

Ns: Number of POs. Ns is the number of POs corresponding to or associated with a PF. Ns*N indicates total number of the POs in the DRX cycle. The parameter Ns is signaled by the gNB in the system information.

N: T/PF Interval

In an example, the UE_ID can be {IMSI mod 1024} or {5G-S-TMSI mod 1024}.

3) The UE monitors the PO indicated by i_s (440). If i_s=0, the UE monitors the 1st PO; If i_s=1, the UE monitors the 2nd PO; If i_s=2, the UE monitors the 3rd PO; and so on.

4) The UE determines the PDCCH monitoring occasions corresponding to the PO indicated by i_s as follows:

Option 1: A Paging Search Space is configured by the gNB, wherein the searchSpaceId other than zero is configured for the Paging Search Space.

The gNB may signal the paging search space configuration (comprising at least one of parameters Monitoring-periodicity-PDCCH-slot, Monitoring-offset-PDCCH-slot, Monitoring-symbols-PDCCH-within-slot and duration). UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. The PDCCH monitoring occasions are there in the slots 'x' to x+duration, where the slot with number 'x' in a radio frame with number 'y' satisfies the Equation 12:

$$(y*(\text{number of slots in a radio frame}) + x - \text{Monitoring-offset-PDCCH-slot}) \bmod (\text{Monitoring-periodicity-PDCCH-slot}) = 0; \quad \text{Equation 12}$$

The starting symbol of a PDCCH monitoring occasion in each slot having the PDCCH monitoring occasion is given by Monitoring-symbols-PDCCH-within-slot. The length (in symbols) of a PDCCH monitoring occasion is given by the coreset associated with the search space.

If the paging search space is configured by the gNB, wherein the searchSpaceId other than zero is configured for the Paging Search Space, based on the paging search space configuration (comprising at least one of parameters Monitoring-periodicity-PDCCH-slot, Monitoring-offset-PDCCH-slot, Monitoring-symbols-PDCCH-within-slot and duration), the UE knows the PDCCH monitoring occasions for paging in the determined PF and the subsequent radio frames. The UE knows the 1st PDCCH monitoring occasion for paging in the determined PF and also the subsequent PDCCH monitoring occasions.

The PDCCH monitoring occasions for paging from the start of determined PF are sequentially numbered from 0. In other words, the PDCCH monitoring occasions starting from the 1st PDCCH monitoring occasion for paging in the paging frame (or from the start of the PF) is sequentially numbered from 0. The maximum number (L) of SSBs per frequency band is pre-defined. The gNB signals the information (SSBPositionsInBurst) related to the actual transmitted SSBs in the system information.

A 1st PO is set of X consecutive PDCCH monitoring occasions starting from $0^{th}$ PDCCH monitoring occasions for paging.

A 2nd PO is set of X consecutive PDCCH monitoring occasions starting from X-$^{th}$ PDCCH monitoring occasions for paging.

A 3rd PO is set of X consecutive PDCCH monitoring occasions starting from 2X-$^{th}$ PDCCH monitoring occasions for paging.

An ith PO is set of X consecutive PDCCH monitoring occasions starting from (i*X)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 1. In other words, the PDCCH monitoring occasions starting from the 1st PDCCH monitoring occasion for paging in the paging frame (or from the start of the PF) is sequentially numbered from 1. The maximum number (L) of SSBs per frequency band is pre-defined. The gNB signals the information (SSBPositionsInBurst) related to the actual transmitted SSBs in the system information.

A 1st PO is set of X consecutive PDCCH monitoring occasions starting from the $1^{st}$ PDCCH monitoring occasions for paging.

A 2nd PO is set of X consecutive PDCCH monitoring occasions starting from X+1-$^{th}$ PDCCH monitoring occasions for paging.

A 3rd PO is set of X consecutive PDCCH monitoring occasions starting from $2X+1$-$^{th}$ PDCCH monitoring occasions for paging.

An ith PO is set of X consecutive PDCCH monitoring occasions starting from $[(i-1)*X)]+1$-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information. In an embodiment, each PO can comprise of 'R' sub POs where each sub PO consists of 'X' PDCCH monitoring occasions, X is number of SSBs; in one embodiment X is maximum number of SSBs i.e. L; in another embodiment X is equal to actual transmitted SSBs. The number of sub POs i.e. R is also signaled by gNB. In its PO (identified by PO index) UE may monitor one or more sub POs. The starting PDCCH monitoring occasion number of each of these sub POs of a PO is signaled by gNB. Alternately, an offset 'O' can be signaled between the sub POs. The starting PDCCH occasions number of $1^{st}$ sub PO is the starting PDCCH occasions number of PO. Let's say starting PDCCH monitoring occasion number of PO is P and offset is O. $1^{st}$ sub PO is a set of X consecutive PDCCH monitoring occasions starting from Pth PDCCH monitoring occasions for paging. $2^{nd}$ sub PO is a set of X consecutive PDCCH monitoring occasions starting from (P+X+O)th PDCCH monitoring occasion for paging. $3^{rd}$ sub PO is a set of X consecutive PDCCH monitoring occasions starting from (P+2X+2O)th PDCCH monitoring occasion for paging and so on.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) is sequentially numbered from 0. The first PDCCH monitoring occasion number for each PO can be signaled by the gNB. For example, if Ns is equal to 4, then the i_s values will be 0 to 3 and there are four POs. The gNB can signal the PDCCH monitoring occasion numbers (P, Q, R, S) one corresponding to each of the POs.

A 1st PO is set of X consecutive PDCCH monitoring occasions starting from P-$^{th}$ PDCCH monitoring occasions for paging.

A 2nd PO is set of X consecutive PDCCH monitoring occasions starting from Q-$^{th}$ PDCCH monitoring occasions for paging.

A 3rd PO is set of X consecutive PDCCH monitoring occasions starting from R-$^{th}$ PDCCH monitoring occasions for paging.

A $4^{th}$ PO is set of X consecutive PDCCH monitoring occasions starting from S-$^{th}$ PDCCH monitoring occasions for paging and so on.

Where X is a number of SSBs. In one embodiment X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame is sequentially numbered from 0. The first PDCCH monitoring occasion number for the first PO can be signaled by the gNB. The gNB can also signal an offset between the starting PDCCH monitoring occasion of each PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+O)-$^{th}$ PDCCH monitoring occasions for paging.

A 3rd PO is set of X consecutive PDCCH monitoring occasions starting from (P+2O)-$^{th}$ PDCCH monitoring occasions for paging.

A $4^{th}$ PO is set of X consecutive PDCCH monitoring occasions starting from (P+3O)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) is sequentially numbered from 0. The first PDCCH monitoring occasion number for the first PO can be signaled by the gNB. The gNB can also signal an offset between a last PDCCH monitoring occasion of a PO and a starting PDCCH monitoring occasion of a next PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+X+O)-$^{th}$ PDCCH monitoring occasions for paging.

A 3rd PO is set of X consecutive PDCCH monitoring occasions starting from (P+2X+2O)-$^{th}$ PDCCH monitoring occasions for paging.

A $4^{th}$ PO is set of X consecutive PDCCH monitoring occasions starting from (P+3X+3O)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the slot index for the first PO can be signaled by the gNB. The gNB can also signal an offset between a starting slot of each PO. For example, if Ns is equal to 4, then the i_s values will be 0 to 3 and there are four POs. The gNB can signal slot index (S) of the first PO and an offset O.

A 1st PO is set of X consecutive PDCCH monitoring occasions starting from the $1^{st}$ PDCCH monitoring occasion in slot S of paging frame.

A 2nd PO is set of X consecutive PDCCH monitoring occasions starting from the $1^{st}$ PDCCH monitoring occasion in slot S+O.

A 3rd PO is set of X consecutive PDCCH monitoring occasions starting from the $1^{st}$ PDCCH monitoring occasion in slot S+2O.

A 4$^{th}$ PO is set of X consecutive PDCCH monitoring occasions starting from the 1$^{st}$ PDCCH monitoring occasion in slot S+3O and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 2: A paging search space is configured by the gNB, wherein the searchSpaceId zero is configured for the Paging Search Space The UE determines the RMSI pattern from the RMSI configuration signaled by the gNB.

If RMSI pattern is 2 or 3
A 1$^{st}$ PO is the set of PDCCH monitoring occasions for the RMSI in a 1$^{st}$ half frame of the determined PF,
A 2$^{nd}$ PO is the set of PDCCH monitoring occasions for the RMSI in 2$^{nd}$ half frame of the determined PF.

If RMSI pattern is 1
A 1$^{st}$ PO is the set of PDCCH monitoring occasions for the RMSI, wherein the 1$^{st}$ PDCCH monitoring occasion starts in determined PF.

Option 3: A paging search space is configured by the gNB, wherein the searchSpaceId zero is configured for the Paging Search Space. If the paging search space with a search space Id zero is configured by the gNB, the PDCCH monitoring occasions for paging are the same as the PDCCH monitoring occasions for the RMSI. Based on the RMSI configuration, the UE knows the PDCCH monitoring occasions for paging in the determined PF and the subsequent radio frames. The UE knows the 1st PDCCH monitoring occasion for paging in the PF and also the subsequent PDCCH monitoring occasions for paging.

The PDCCH monitoring occasions starting from the 1st PDCCH monitoring occasion for paging in the paging frame (or from the start of the PF) are sequentially numbered from 0.

A 1st PO is set of X consecutive PDCCH monitoring occasions starting from 0th PDCCH monitoring occasions for paging.

2nd PO is set of X consecutive PDCCH monitoring occasions starting from X-$^{th}$ PDCCH monitoring occasions for paging.

A 3rd PO is set of X consecutive PDCCH monitoring occasions starting from 2X-$^{th}$ PDCCH monitoring occasions for paging.

An ith PO is set of X consecutive PDCCH monitoring occasions starting from (i*X)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions starting from the 1st PDCCH monitoring occasion for paging in the paging frame (or from the start of the PF) is sequentially numbered from 1.

A 1st PO is set of X consecutive PDCCH monitoring occasions starting from the 1$^{st}$ PDCCH monitoring occasions for paging.

A 2nd PO is set of X consecutive PDCCH monitoring occasions starting from X+1-$^{th}$ PDCCH monitoring occasions for paging.

A 3rd PO is set of X consecutive PDCCH monitoring occasions starting from 2X+1-$^{th}$ PDCCH monitoring occasions for paging.

An ith PO is set of X consecutive PDCCH monitoring occasions starting from [(i−1)*X)]+1-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 4: Subframes or slots corresponding to each PO is pre-defined as m LTE.

Embodiment 5

Figure 5:
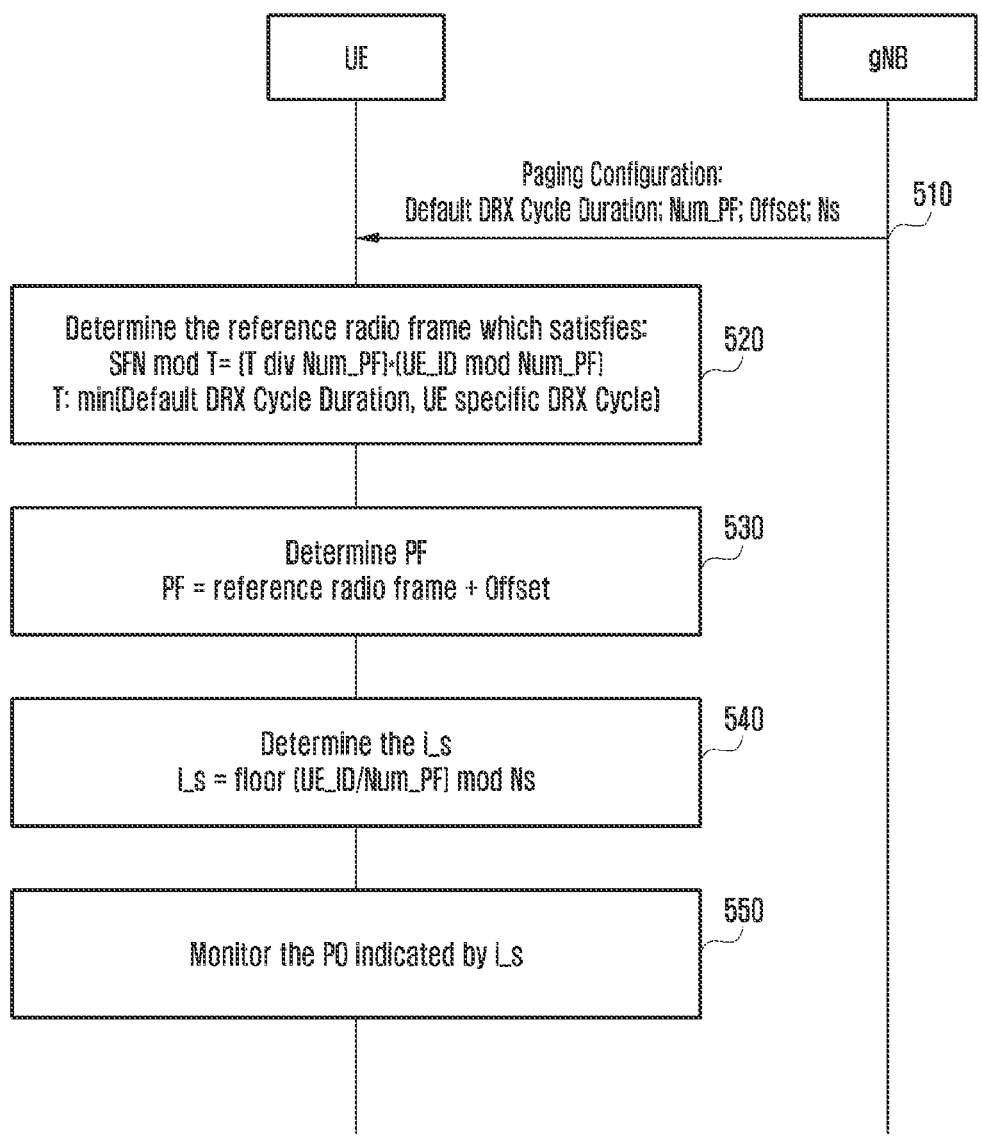
FIG. 5 illustrates another example of determining PO according to an embodiment of the disclosure.

FIG. 5 illustrates another example of determining PO according to an embodiment of the disclosure.

Referring to FIG. 5:

0) The UE acquires the paging configuration (Default DRX Cycle Duration, Num_PF, Ns, Offset), the paging search space configuration (if signaled by the network) and the RMSI configuration (RMSI search space, RMSI pattern info: Pattern 1, 2, 3) from the system information signaled by the network (510). RMSI is also be referred as the SIB1. The RMSI pattern is also referred as the SS/PBCH block and CORESET multiplexing pattern. In the RRC Connected State, the paging search space configuration is signaled by the network for one or more configured BWP(s) in dedicated signaling and the UE uses the paging search space configuration of its active DL BWP.

1) The UE first derives a reference radio frame (520). The reference frame is the radio frame with the SFN which satisfies following Equation 13:

$$\text{SFN mod } T=(T \text{ div Num\_PF})*(UE\_ID \text{ mod Num\_PF}) \quad \text{Equation 13}$$

Where,

T: DRX cycle of the UE. T is determined by the shortest of the UE specific DRX values, if configured by the RRC or by upper layers (e.g. NAS), and a default DRX value signaled in the system information. If the UE specific DRX is not configured by the RRC or by the upper layers, the default value is applied.

Num_PF: a number of paging frames in the DRX cycle. Num_PF is signaled by the gNB in the system information. The values of Num_PF can be T, T/2, T/4, T/8, T/16, T/32 and so on.

2) The UE then determines if the paging frame where the paging frame is the radio frame having the SFN equal to 'SFN of reference frame+offset' (530). The Parameter Offset is signalled by the gNB in the system information. The offset is in units of the radio frames.

For example, if the determined reference frame is the SFN 'X' and the offset signalled by the network is 'Y', the paging frame is the radio frame were the SFN equals X+Y.

The paging frame is the radio frame with respect to which the UE determines its PO. A PO associated with a PF may start in the PF or after the PF. A PO which starts in the paging frame may end in a subsequent radio frame.

3) The UE then calculates an index i_s (540), where i_s is derived from the following Equation 14:

$$i\_s=\text{floor}(UE\_ID/Num\_PF) \bmod Ns, \text{ where} \quad \text{Equation 14}$$

Ns: Number of POs corresponding to or associated with a PF. Ns*Num_PF indicates the total number of POs in DRX cycle. The parameter Ns is signaled by the gNB in the system information.

In an example, the UE_ID can be {IMSI mod 1024} or {5G-S-TMSI mod 1024}.

4) The UE monitors the PO indicated by i_s (550). If i_s=0, the UE monitors the 1st PO; If i_s=1, the UE monitors the 2nd PO; If i_s=2, UE monitors the 3rd PO; and so on . . . .

The UE determines the PDCCH monitoring occasions corresponding to the PO indicated by i_s as follows:

Option 1: The Paging Search Space is configured by the gNB, wherein the searchSpaceId other than zero is configured for the Paging Search Space The gNB may signal paging search space configuration (comprising at least one of parameters Monitoring-periodicity-PDCCH-slot, Monitoring-offset-PDCCH-slot, Monitoring-symbols-PDCCH-within-slot and duration). UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. The PDCCH monitoring occasions are there in the slots 'x' to x+duration, where the slot with number 'x' in a radio frame with number 'y' satisfies the Equation 15:

$$(y*(\text{number of slots in a radio frame})+x-\text{Monitoring-offset-PDCCH-slot}) \bmod (\text{Monitoring-periodicity-PDCCH-slot})=0; \quad \text{Equation 15}$$

The starting symbol of a PDCCH monitoring occasion in each slot having the PDCCH monitoring occasion is given by Monitoring-symbols-PDCCH-within-slot. The length (in symbols) of a PDCCH monitoring occasion is given in the corset associated with the search space.

If the paging search space is configured by the gNB, wherein the searchSpaceId other than zero is configured for the Paging Search Space, based on the paging search space configuration (comprising at least one of parameters Monitoring-periodicity-PDCCH-slot, Monitoring-offset-PDCCH-slot, Monitoring-symbols-PDCCH-within-slot and duration), the UE knows the PDCCH monitoring occasions for paging in the determined PF and the subsequent radio frames. The UE knows the 1st PDCCH monitoring occasion for paging in the determined PF and also the subsequent PDCCH monitoring occasions.

The PDCCH monitoring occasions starting from the 1st PDCCH monitoring occasion for paging in the paging frame (or from the start of the PF) are sequentially numbered from 0. The maximum number (L) of SSBs per frequency band is pre-defined. The gNB signals the information (SSBPositionsInBurst) related to actual transmitted SSBs in the system information.

A 1st PO is set of X consecutive PDCCH monitoring occasions starting from $0\text{-}^{th}$ PDCCH monitoring occasions for paging.

A 2nd PO is set of X consecutive PDCCH monitoring occasions starting from $X\text{-}^{th}$ PDCCH monitoring occasions for paging.

A 3rd PO is set of X consecutive PDCCH monitoring occasions starting from $2X\text{-}^{th}$ PDCCH monitoring occasions for paging.

An ith PO is set of X consecutive PDCCH monitoring occasions starting from $(i*X)\text{-}^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 1. In other words, the PDCCH monitoring occasions starting from the 1st PDCCH monitoring occasion for paging in the paging frame (or from the start of the PF) is sequentially numbered from 1. The maximum number (L) of SSBs per frequency band is pre-defined. The gNB signals the information (SSBPositionsInBurst) related to actual transmitted SSBs in the system information.

A 1st PO is set of X consecutive PDCCH monitoring occasions starting from the $1^{st}$ PDCCH monitoring occasions for paging.

A 2nd PO is set of X consecutive PDCCH monitoring occasions starting from $X+1\text{-}^{th}$ PDCCH monitoring occasions for paging.

A 3rd PO is set of X consecutive PDCCH monitoring occasions starting from $2X+1\text{-}^{th}$ PDCCH monitoring occasions for paging.

An ith PO is set of X consecutive PDCCH monitoring occasions starting from $[(i-1)*X)]+1\text{-}^{th}$ PDCCH monitoring occasions for paging and so on.

Where X is a number of SSBs. In one embodiment, X is maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the $1^{st}$ PDCCH monitoring occasion for paging in the paging frame (or from the start of the paging frame) is sequentially numbered from 0. The first PDCCH monitoring occasion number for each PO can be signaled by the gNB. For example, if Ns is equal to 4, then the i_s values will be 0 to 3 and there are four POs. The gNB can signal the PDCCH monitoring occasion numbers (P, Q, R, S) one corresponding to each of the POs.

A 1st PO is set of X consecutive PDCCH monitoring occasions starting from $P\text{-}^{th}$ PDCCH monitoring occasions for paging.

A 2nd PO is set of X consecutive PDCCH monitoring occasions starting from $Q\text{-}^{th}$ PDCCH monitoring occasions for paging.

A 3rd PO is set of X consecutive PDCCH monitoring occasions starting from $R\text{-}^{th}$ PDCCH monitoring occasions for paging.

A $4^{th}$ PO is set of X consecutive PDCCH monitoring occasions starting from $S\text{-}^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information. In an embodiment, each PO can comprise of 'R' sub POs where each sub PO consists of 'X' PDCCH monitoring occasions, X is number of SSBs; in one embodiment X is maximum number of SSBs i.e. L; in another embodiment X is equal to actual transmitted SSBs. The number of sub POs i.e. R is also signaled by gNB. In its PO (identified by PO index) UE may monitor one or more sub POs. The starting PDCCH monitoring occasion number of each of these sub POs of a PO is signaled by gNB. Alternately, an offset 'O' can be signaled between the sub POs. The starting PDCCH occasions number of 1st sub PO is the starting PDCCH occasions number of PO. Let's say starting PDCCH monitoring occasion number of PO is P and offset is O. $1^{st}$ sub PO is a set of X consecutive PDCCH monitoring occasions starting from Pth PDCCH monitoring occasions for paging. $2^{nd}$ sub PO is a set of X consecutive PDCCH monitoring occasions starting from (P+X+O)th PDCCH monitoring occasion for paging. $3^{rd}$ sub PO is a set of X consecutive PDCCH monitoring occasions starting from (P+2X+2O)th PDCCH monitoring occasion for paging and so on.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) is sequentially numbered from 0. The first PDCCH monitoring occasion number for the first PO can be signaled by the gNB. The gNB can also signal an offset between the starting PDCCH monitoring occasion of each PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+O)-$^{th}$ PDCCH monitoring occasions for paging.

A 3rd PO is set of X consecutive PDCCH monitoring occasions starting from (P+2O)-$^{th}$ PDCCH monitoring occasions for paging.

An $4^{th}$ PO is set of X consecutive PDCCH monitoring occasions starting from (P+3O)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) are sequentially numbered from 0. The first PDCCH monitoring occasion number for the first PO can be signaled by the gNB. The gNB can also signal an offset between the last PDCCH monitoring occasion of a PO and a starting PDCCH monitoring occasion of the next PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+X+O)-$^{th}$ PDCCH monitoring occasions for paging.

A 3rd PO is set of X consecutive PDCCH monitoring occasions starting from (P+2X+2O)-$^{th}$ PDCCH monitoring occasions for paging.

A $4^{th}$ PO is set of X consecutive PDCCH monitoring occasions starting from (P+3X+3O)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the slot index for the first PO can be signaled by the gNB. The gNB can also signal an offset between the starting slot of each PO. For example, if Ns is equal to 4, then the i_s values will be 0 to 3 and there are four POs. The gNB can signal slot index (S) of the first PO and an offset O.

A 1st PO is set of X consecutive PDCCH monitoring occasions starting from the $1^{st}$ PDCCH monitoring occasion in slot S of paging frame.

A 2nd PO is set of X consecutive PDCCH monitoring occasions starting from the $1^{st}$ PDCCH monitoring occasion in slot S+O.

A 3rd PO is set of X consecutive PDCCH monitoring occasions starting from the $1^{st}$ PDCCH monitoring occasion in slot S+2O.

A 4th PO is set of X consecutive PDCCH monitoring occasions starting from the $1^{st}$ PDCCH monitoring occasion in slot S+3O and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 2: The Paging search space is configured by the gNB, wherein the searchSpaceId zero is configured for the Paging Search Space.

The UE determines the RMSI pattern from the RMSI configuration signaled by the gNB.

If RMSI pattern is 2 or 3,

A $1^{st}$ PO is the set of PDCCH monitoring occasions for the RMSI in the $1^{st}$ half frame of the determined PF, and A $2^{nd}$ PO is the set of PDCCH monitoring occasions for the RMSI in the $2^{nd}$ half frame of the determined PF.

If RMSI pattern is 1,

A $1^{st}$ PO is the set of PDCCH monitoring occasions for the RMSI, wherein the $1^{st}$ PDCCH monitoring occasion starts in the determined PF.

Option 3: The Paging search space is configured by the gNB, wherein the searchSpaceId zero is configured for the Paging Search Space.

If the paging search space with the search space Id zero is configured by the gNB, the PDCCH monitoring occasions for paging are same as the PDCCH monitoring occasions for the RMSI. Based on the RMSI configuration, the UE knows the PDCCH monitoring occasions for paging in the determined PF and the subsequent radio frames. The UE knows the 1st PDCCH monitoring occasion for paging in the PF and also the subsequent PDCCH monitoring occasions for paging.

The PDCCH monitoring occasions starting from the 1st PDCCH monitoring occasion for paging in the paging frame is sequentially numbered from 0.

A 1st PO is set of X consecutive PDCCH monitoring occasions starting from 0-$^{th}$ PDCCH monitoring occasions for paging.

A 2nd PO is set of X consecutive PDCCH monitoring occasions starting from X-$^{th}$ PDCCH monitoring occasions for paging.

A 3rd PO is set of X consecutive PDCCH monitoring occasions starting from 2X-$^{th}$ PDCCH monitoring occasions for paging.

An ith PO is set of X consecutive PDCCH monitoring occasions starting from (i*X)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, PDCCH monitoring occasions starting from the 1st PDCCH monitoring occasion for paging in the paging frame (or from the start of the PF) is sequentially numbered from 1.

A 1st PO is set of X consecutive PDCCH monitoring occasions starting from the $1^{st}$ PDCCH monitoring occasions for paging.

A 2nd PO is set of X consecutive PDCCH monitoring occasions starting from X+1-$^{th}$ PDCCH monitoring occasions for paging.

A 3rd PO is set of X consecutive PDCCH monitoring occasions starting from 2X+1-$^{th}$ PDCCH monitoring occasions for paging.

An ith PO is set of X consecutive PDCCH monitoring occasions starting from [(i−1)*X)]+1-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 4: Subframes or slots corresponding to each PO is pre-defined as m LTE.

Embodiment 6

Figure 6:
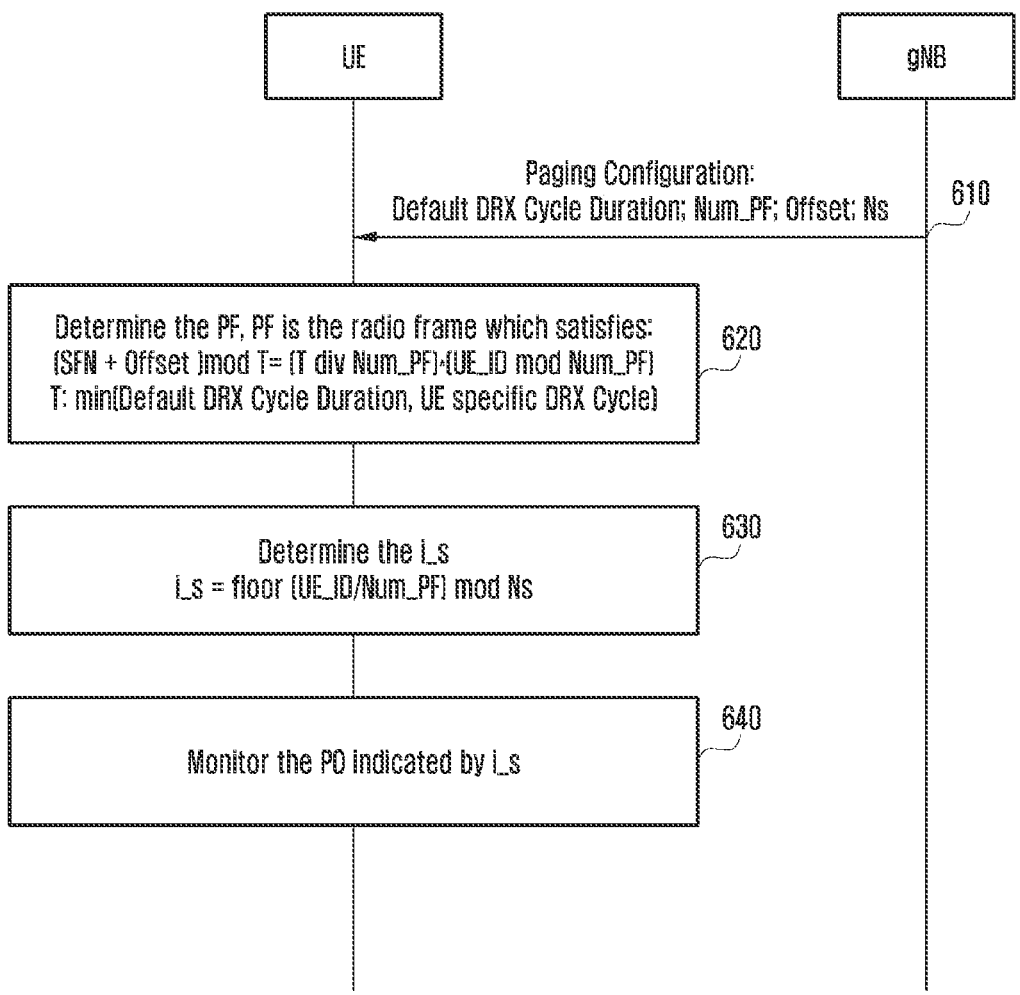
FIG. 6 illustrates another example of determining PO according to an embodiment of the disclosure.

FIG. 6 illustrates another example of determining PO according to an embodiment of the disclosure.

Referring to FIG. 6:

0) The UE acquires the paging configuration (Default DRX Cycle Duration, Num_PF, Ns, Offset), the paging search space configuration (if signaled by the network) and the RMSI configuration (RMSI search space, RMSI pattern info: Pattern 1, 2, 3) from the system information signaled by the network (610). The RMSI is also be referred as SIB1. The RMSI pattern is also referred as the SS/PBCH block a nd CORESET multiplexing pattern. In the RRC Connected State, the paging search space configuration is signaled by the network for one or more configured BWP(s) in dedicated signaling and the UE uses the paging search space configuration of its active DL BWP.

1) The UE first derives a Paging frame (620). The paging frame is the radio frame with The SFN which satisfies following Equation 16:

(SFN+offset)mod T=(T div Num_PF)*(UE_ID mod Num_PF)   Equation 16

Where,

T: DRX cycle of the UE. T is determined by the shortest of the UE specific DRX values, if configured by the RRC or by the upper layers (e.g. NAS), and a default DRX value signaled in the system information. If the UE specific DRX is not configured by the RRC or by the upper layers, the default value is applied.

Num_PF: number of paging frames in the DRX cycle. The Num_PF is signaled by the gNB in the system information. The values of the Num_PF can be T, T/2, T/4, T/8, T/16, T/32 and so on.

In an example, the UE_ID can be {IMSI mod 1024} or {5G-S-TMSI mod 1024}.

The paging frame is the radio frame with respect to which the UE determines its PO. A PO associated with a PF may start in the PF or after the PF. A PO which starts in the paging frame may end in the subsequent radio frame.

2) The UE then calculates an index i_s (630), where i_s is derived from the following Equation 17:

i_s=floor(UE_ID/Num_PF)mod Ns, where   Equation 17

Ns: Ns*Num_PF indicates the total number of POs in DRX cycle. The parameter Ns is signaled by the gNB in the system information.

In an example, the UE_ID can be {IMSI mod 1024} or {5G-S-TMSI mod 1024}.

3) The UE monitors the PO indicated by i_s (640). If i_s=0, the UE monitors the 1st PO; If i_s=1, the UE monitors the 2nd PO; If i_s=2, the UE monitors the 3rd PO; and so on.

4) The UE determines the PDCCH monitoring occasions corresponding to the PO indicated by i_s as follows:

Option 1: The Paging Search Space is configured by the gNB, wherein the searchSpaceId other than zero is configured for the Paging Search Space.

The gNB may signal the paging search space configuration (comprising at least one of parameters Monitoring-periodicity-PDCCH-slot, Monitoring-offset-PDCCH-slot, Monitoring-symbols-PDCCH-within-slot and duration). The UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. The PDCCH monitoring occasions are there in the slots 'x' to x+duration, where the slot with number 'x' in a radio frame with number 'y' satisfies the Equation 18:

(y*(number of slots in a radio frame)+x−Monitoring-offset-PDCCH-slot)mod (Monitoring-periodicity-PDCCH-slot)=0;   Equation 18

The starting symbol of a PDCCH monitoring occasion in each slot having the PDCCH monitoring occasion is given by Monitoring-symbols-PDCCH-within-slot. The length (in symbols) of a PDCCH monitoring occasion is given in the coreset associated with the search space.

If the paging search space is configured by the gNB, wherein the searchSpaceId other than zero is configured for the Paging Search Space, based on paging search space configuration (comprising at least one of parameters Monitoring-periodicity-PDCCH-slot, Monitoring-offset-PDCCH-slot, Monitoring-symbols-PDCCH-within-slot and duration), the UE knows the PDCCH monitoring occasions for paging in the determined PF and subsequent radio frames. The UE knows the 1st PDCCH monitoring occasion for paging in the determined PF and also the subsequent PDCCH monitoring occasions.

The PDCCH monitoring occasions for paging from the start of the determined PF are sequentially numbered from 0. In other words, the PDCCH monitoring occasions starting from the $1^{st}$ PDCCH monitoring occasion for paging in the paging frame (or from the start of the PF) are sequentially numbered from 0. The maximum number (L) of SSBs per frequency band is pre-defined. The gNB signals the information (SSBPositionsInBurst) related to the actual transmitted SSBs in the system information.

A 1st PO is set of X consecutive PDCCH monitoring occasions starting from 0-$^{th}$ PDCCH monitoring occasions for paging.

A 2nd PO is set of X consecutive PDCCH monitoring occasions starting from X-$^{th}$ PDCCH monitoring occasions for paging.

A 3rd PO is set of X consecutive PDCCH monitoring occasions starting from 2X-$^{th}$ PDCCH monitoring occasions for paging.

An ith PO is set of X consecutive PDCCH monitoring occasions starting from $(i*X)$-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 1. In other words, the PDCCH monitoring occasions starting from the 1st PDCCH monitoring occasion for paging in the paging frame (or from the start of the PF) is sequentially numbered from 1. The maximum number (L) of SSBs per frequency band is pre-defined. The gNB signals the information (SSBPositionsInBurst) related to the actual transmitted SSBs in the system information.

A 1st PO is set of X consecutive PDCCH monitoring occasions starting from $1^{st}$ PDCCH monitoring occasions for paging.

A 2nd PO is set of X consecutive PDCCH monitoring occasions starting from $X+1$-$^{th}$ PDCCH monitoring occasions for paging.

A 3rd PO is set of X consecutive PDCCH monitoring occasions starting from $2X+1$-$^{th}$ PDCCH monitoring occasions for paging.

An ith PO is set of X consecutive PDCCH monitoring occasions starting from $[(i-1)*X)]+1$-$^{th}$ PDCCH monitoring occasions for paging; and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the $1^{st}$ PDCCH monitoring occasion for paging in the paging frame (or from the start of the paging frame) is sequentially numbered from 0. The first PDCCH monitoring occasion number for each PO can be signaled by the gNB. For example, if Ns is equal to 4, then the i_s values will be 0 to 3 and there are four POs. The gNB can signal the PDCCH monitoring occasion numbers (P, Q, R, S) one corresponding to each of the POs.

A 1st PO is set of X consecutive PDCCH monitoring occasions starting from P-$^{th}$ PDCCH monitoring occasions for paging.

A 2nd PO is set of X consecutive PDCCH monitoring occasions starting from Q-$^{th}$ PDCCH monitoring occasions for paging.

A 3rd PO is set of X consecutive PDCCH monitoring occasions starting from R-$^{th}$ PDCCH monitoring occasions for paging.

A $4^{th}$ PO is set of X consecutive PDCCH monitoring occasions starting from S-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information. In an embodiment, each PO can comprise of 'R' sub POs where each sub PO consists of 'X' PDCCH monitoring occasions, X is number of SSBs; in one embodiment X is maximum number of SSBs i.e. L; in another embodiment X is equal to actual transmitted SSBs. The number of sub POs i.e. R is also signaled by gNB. In its PO (identified by PO index) UE may monitor one or more sub POs. The starting PDCCH monitoring occasion number of each of these sub POs of a PO is signaled by gNB. Alternately, an offset 'O' can be signaled between the sub POs. The starting PDCCH occasions number of 1st sub PO is the starting PDCCH occasions number of PO. Let's say starting PDCCH monitoring occasion number of PO is P and offset is O. $1^{st}$ sub PO is a set of X consecutive PDCCH monitoring occasions starting from Pth PDCCH monitoring occasions for paging. $2^{nd}$ sub PO is a set of X consecutive PDCCH monitoring occasions starting from (P+X+O)th PDCCH monitoring occasion for paging. $3^{rd}$ sub PO is a set of X consecutive PDCCH monitoring occasions starting from (P+2X+2O)th PDCCH monitoring occasion for paging and so on.

Alternately, the PDCCH monitoring occasions for paging from the start of the determined PF are sequentially numbered from 0. In other words, the PDCCH monitoring occasions starting from the $1^{st}$ PDCCH monitoring occasion for paging in the paging frame (or from the start of the paging frame) are sequentially numbered from 0. The first PDCCH monitoring occasion number for the first PO can be signaled by the gNB. The gNB can also signal an offset between the starting PDCCH monitoring occasion of each PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+O)-$^{th}$ PDCCH monitoring occasions for paging.

A 3rd PO is set of X consecutive PDCCH monitoring occasions starting from (P+2O)-$^{th}$ PDCCH monitoring occasions for paging.

A $4^{th}$ PO is set of X consecutive PDCCH monitoring occasions starting from (P+3O) PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the $1^{st}$ PDCCH monitoring occasion for paging in the paging frame (or from the start of the paging frame) are sequentially numbered from 0. The first PDCCH monitoring occasion number for the first PO can be signaled by the gNB. The gNB can also signal an offset between the last PDCCH monitoring occasion of a PO and the starting PDCCH monitoring occasion of next PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+X+O)-$^{th}$ PDCCH monitoring occasions for paging.

A 3rd PO is set of X consecutive PDCCH monitoring occasions starting from (P+2X+2O)-$^{th}$ PDCCH monitoring occasions for paging.

A 4$^{th}$ PO is set of X consecutive PDCCH monitoring occasions starting from (P+3X+3O)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the slot index for the first PO can be signaled by the gNB. The gNB can also signal an offset between the starting slot of each PO. For example, if Ns is equal to 4, then the i_s values will be 0 to 3 and there are four POs. The gNB can signal slot index (S) of the first PO and an offset O.

A 1st PO is set of X consecutive PDCCH monitoring occasions starting from 1$^{st}$ PDCCH monitoring occasion in slot S of paging frame.

A 2nd PO is set of X consecutive PDCCH monitoring occasions starting from 1$^{st}$ PDCCH monitoring occasion in slot S+O.

A 3rd PO is set of X consecutive PDCCH monitoring occasions starting from 1$^{st}$ PDCCH monitoring occasion in slot S+2O.

A 4$^{th}$ PO is set of X consecutive PDCCH monitoring occasions starting from 1$^{st}$ PDCCH monitoring occasion in slot S+3O and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 2: The Paging search space is configured by the gNB, wherein the searchSpaceId zero is configured for the Paging Search Space.

The UE determines the RMSI pattern from the RMSI configuration signaled by the gNB.

If RMSI pattern is 2 or 3,
The 1st PO is the set of PDCCH monitoring occasions for the RMSI in the 1$^{st}$ half frame of determined PF.
The 2$^{nd}$ PO is the set of PDCCH monitoring occasions for the RMSI in the 2$^{nd}$ half frame of determined PF.

If RMSI pattern is 1,
The 1$^{st}$ PO is the set of PDCCH monitoring occasions for the RMSI, wherein the 1$^{st}$ PDCCH monitoring occasion starts in the determined PF.

Option 3: The Paging search space is configured by the gNB, wherein the searchSpaceId zero is configured for the Paging Search Space.

If the paging search space with search space Id zero is configured by the gNB, PDCCH monitoring occasions for paging are same as PDCCH monitoring occasions for the RMSI. Based on the RMSI configuration, the UE knows the PDCCH monitoring occasions for paging in the determined PF and the subsequent radio frames. The UE knows the 1st PDCCH monitoring occasion for paging in the PF and also the subsequent PDCCH monitoring occasions for paging.

The PDCCH monitoring occasions starting from the 1st PDCCH monitoring occasion for paging in the paging frame (or from the start of the PF) are sequentially numbered from 0.

A 1st PO is set of X consecutive PDCCH monitoring occasions starting from 0-$^{th}$ PDCCH monitoring occasions for paging.

A 2nd PO is set of X consecutive PDCCH monitoring occasions starting from X-$^{th}$ PDCCH monitoring occasions for paging.

A 3rd PO is set of X consecutive PDCCH monitoring occasions starting from 2X-$^{th}$ PDCCH monitoring occasions for paging.

An ith PO is set of X consecutive PDCCH monitoring occasions starting from (i*X)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information. In an embodiment, each PO can comprise of 'R' sub POs where each sub PO consists of 'X' PDCCH monitoring occasions, X is number of SSBs; in one embodiment X is maximum number of SSBs i.e. L; in another embodiment X is equal to actual transmitted SSBs. The number of sub POs i.e. R is also signaled by gNB. In its PO (identified by PO index) UE may monitor one or more sub POs. The starting PDCCH monitoring occasion number of each of these sub POs of a PO is signaled by gNB. Alternately, an offset 'O' can be signaled between the sub POs. The starting PDCCH occasions number of 1$^{st}$ sub PO is the starting PDCCH occasions number of PO. Let's say starting PDCCH monitoring occasion number of PO is P and offset is O. 1$^{st}$ sub PO is a set of X consecutive PDCCH monitoring occasions starting from Pth PDCCH monitoring occasions for paging. 2$^{nd}$ sub PO is a set of X consecutive PDCCH monitoring occasions starting from (P+X+O)th PDCCH monitoring occasion for paging. 3$^{rd}$ sub PO is a set of X consecutive PDCCH monitoring occasions starting from (P+2X+2O)th PDCCH monitoring occasion for paging and so on.

Alternately, the PDCCH monitoring occasions starting from the 1st PDCCH monitoring occasion for paging in the paging frame (or from the start of the PF) are sequentially numbered from 1.

A 1st PO is set of X consecutive PDCCH monitoring occasions starting from 1$^{st}$ PDCCH monitoring occasions for paging.

A 2nd PO is set of X consecutive PDCCH monitoring occasions starting from X+1-$^{th}$ PDCCH monitoring occasions for paging.

A 3rd PO is set of X consecutive PDCCH monitoring occasions starting from 2X+1-$^{th}$ PDCCH monitoring occasions for paging.

An ith PO is set of X consecutive PDCCH monitoring occasions starting from [(i−1)*X)]+1-$^{th}$ PDCCH monitoring occasions for paging; and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 4: Subframes or slots corresponding to each PO is pre-defined as in LTE.

Embodiment 7

Figure 7:
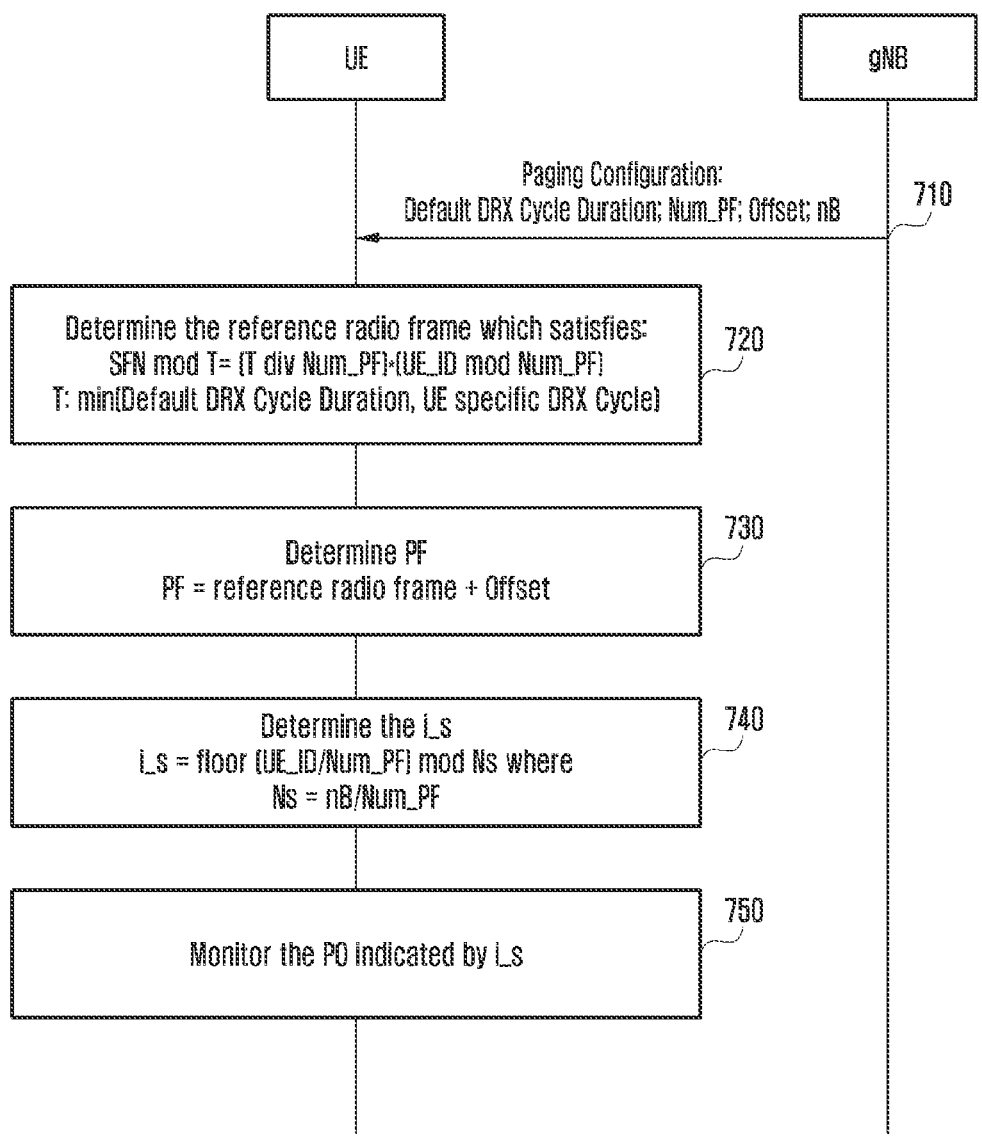
FIG. 7 illustrates another example of determining PO according to an embodiment of the disclosure.

FIG. 7 illustrates another example of determining according to an embodiment of the disclosure.

Referring to FIG. 7:

0) The UE acquires the paging configuration (Default DRX Cycle Duration, Num_PF, nB, Offset), the paging search space configuration (if signaled by the network) and the RMSI configuration (RMSI search space, RMSI pattern info: Pattern 1, 2, 3) from the system information signaled by the network (710). The RMSI is also be referred as SIB1. The RMSI pattern is also referred as the SS/PBCH block and the CORESET multiplexing pattern. In the RRC Connected State, the paging search space configuration is signaled by the network for one or more configured BWP(s) in dedicated signaling and the UE uses the paging search space configuration of its active DL BWP.

1) The UE first derives a reference radio frame (720). The reference frame is the radio frame with the SFN which satisfies following Equation 19:

$$\text{SFN mod } T = (T \text{ div Num\_PF}) * (\text{UE\_ID mod Num\_PF}) \qquad \text{Equation 19}$$

Where,

T: DRX cycle of the UE. T is determined by the shortest of the UE specific DRX values, if configured by the RRC or by the upper layers (e.g. NAS), and a default DRX value signaled in the system information. If the UE specific DRX is not configured by the RRC or by the upper layers, the default value is applied.

Num_PF: number of the paging frames in the DRX cycle. Num_PF is signaled by the gNB in the system information. The values of Num_PF can be T, T/2, T/4, T/8, T/16, T/32 and so on.

2) The UE then determines the paging frame, where the paging frame is the radio frame having the SFN equal to 'SFN of reference frame+offset' (730). The Parameter Offset is signalled by the gNB in the system information. The Offset is in units of radio frames.

For example, if the determined reference frame is the SFN 'X' and the offset signalled by the network is 'Y', the paging frame is the radio frame were the SFN equals X+Y.

The Paging frame is the radio frame with respect to which the UE determines its PO. A PO associated with a PF may start in the PF or after the PF. A PO which starts in the paging frame may end in the subsequent radio frame.

3) The UE then calculates an index i_s (740), where i_s is derived from the following Equation 20:

$$i\_s = \text{floor}(\text{UE\_ID}/\text{Num\_PF}) \text{ mod } Ns, \text{ where} \qquad \text{Equation 20}$$

Ns: nB/Num_PF. Ns*Num_PF indicates the total number of POs in DRX cycle.

nB: Total number of POs in DRX cycle.

In an example, the UE_ID can be {IMSI mod 1024} or {5G-S-TMSI mod 1024}.

4) The UE monitors the PO indicated by i_s (750). If i_s=0, the UE monitors the 1st PO; If i_s=1, the UE monitors the 2nd PO; If i_s=2, the UE monitors the 3rd PO; and so on.

5) The UE determines the PDCCH monitoring occasions corresponding to the PO indicated by i_s as follows:

Option 1: The Paging Search Space is configured by the gNB, wherein the searchSpaceId other than zero is configured for the Paging Search Space The gNB may signal paging search space configuration (comprising at least one of parameters Monitoring-periodicity-PDCCH-slot, Monitoring-offset-PDCCH-slot, Monitoring-symbols-PDCCH-within-slot and duration). The UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. The PDCCH monitoring occasions are there in the slots 'x' to x+duration, where the slot with number 'x' in a radio frame with number 'y' satisfies the Equation 21:

$$(y*(\text{number of slots in a radio frame}) + x - \text{Monitoring-offset-PDCCH-slot}) \text{mod } (\text{Monitoring-periodicity-PDCCH-slot}) = 0; \qquad \text{Equation 21}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space.

If the paging search space is configured by the gNB, wherein the searchSpaceId other than zero is configured for the Paging Search Space, based on paging search space configuration (comprising at least one of parameters Monitoring-periodicity-PDCCH-slot, Monitoring-offset-PDCCH-slot, Monitoring-symbols-PDCCH-within-slot and duration), the UE knows the PDCCH monitoring occasions for paging in the determined PF and the subsequent radio frames. The UE knows the 1st PDCCH monitoring occasion for paging in the determined PF and also the subsequent PDCCH monitoring occasions.

The PDCCH monitoring occasions for paging from the start of the determined PF are sequentially numbered from 0. In other words, the PDCCH monitoring occasions starting from the 1st PDCCH monitoring occasion for paging in the paging frame (or from the start of the PF) is sequentially numbered from 0. The maximum number (L) of SSBs per frequency band is pre-defined. The gNB signals the information (SSBPositionsInBurst) related to the actual transmitted SSBs in the system information.

A 1st PO is set of X consecutive PDCCH monitoring occasions starting from $0\text{-}^{th}$ PDCCH monitoring occasions for paging.

A 2nd PO is set of X consecutive PDCCH monitoring occasions starting from $X\text{-}^{th}$ PDCCH monitoring occasions for paging.

A 3rd PO is set of X consecutive PDCCH monitoring occasions starting from $2X\text{-}^{th}$ PDCCH monitoring occasions for paging.

An ith PO is set of X consecutive PDCCH monitoring occasions starting from $(i*X)\text{-}^{th}$ PDCCH monitoring occasions for paging and so on.

Where X is a number of SSBs. In one embodiment, X is maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 1. In other words, the PDCCH monitoring occasions starting from the 1st PDCCH monitoring occasion for paging in the paging frame (or from the start of PF) are sequentially numbered from 1. The maximum number (L) of SSBs per frequency band is pre-defined. The gNB signals the information (SSBPositionsInBurst) related to actual transmitted SSBs in the system information.

A 1st PO is set of X consecutive PDCCH monitoring occasions starting from $1^{st}$ PDCCH monitoring occasions for paging.

A 2nd PO is set of X consecutive PDCCH monitoring occasions starting from $X+1\text{-}^{th}$ PDCCH monitoring occasions for paging.

A 3rd PO is set of X consecutive PDCCH monitoring occasions starting from $2X+1\text{-}^{th}$ PDCCH monitoring occasions for paging.

An ith PO is set of X consecutive PDCCH monitoring occasions starting from $[(i-1)*X]+1\text{-}^{th}$ PDCCH monitoring occasions for paging and so on.

Where X is a number of SSBs. In one embodiment, X is maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) are sequentially numbered from 0. The first PDCCH monitoring occasion number for each PO can be signaled by the gNB. For example, if Ns is equal to 4, then the i_s values will be 0 to 3 and there are four POs. The gNB can signal the PDCCH monitoring occasion numbers (P, Q, R, S) one corresponding to each of the POs.

A 1st PO is set of X consecutive PDCCH monitoring occasions starting from $P\text{-}^{th}$ PDCCH monitoring occasions for paging.

A 2nd PO is set of X consecutive PDCCH monitoring occasions starting from $Q\text{-}^{th}$ PDCCH monitoring occasions for paging.

A 3rd PO is set of X consecutive PDCCH monitoring occasions starting from $R\text{-}^{th}$ PDCCH monitoring occasions for paging.

A 4th PO is set of X consecutive PDCCH monitoring occasions starting from $S\text{-}^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information. In an embodiment, each PO can comprise of 'R' sub POs where each sub PO consists of 'X' PDCCH monitoring occasions, X is number of SSBs; in one embodiment X is maximum number of SSBs i.e. L; in another embodiment X is equal to actual transmitted SSBs. The number of sub POs i.e. R is also signaled by gNB. In its PO (identified by PO index) UE may monitor one or more sub POs. The starting PDCCH monitoring occasion number of each of these sub POs of a PO is signaled by gNB. Alternately, an offset 'O' can be signaled between the sub POs. The starting PDCCH occasions number of $1^{st}$ sub PO is the starting PDCCH occasions number of PO. Let's say starting PDCCH monitoring occasion number of PO is P and offset is O. $1^{st}$ sub PO is a set of X consecutive PDCCH monitoring occasions starting from Pth PDCCH monitoring occasions for paging. $2^{nd}$ sub PO is a set of X consecutive PDCCH monitoring occasions starting from (P+X+O)th PDCCH monitoring occasion for paging. $3^{rd}$ sub PO is a set of X consecutive PDCCH monitoring occasions starting from (P+2X+2O)th PDCCH monitoring occasion for paging and so on.

Alternately, the PDCCH monitoring occasions for paging from the start of the determined PF are sequentially numbered from 0. In other words, the PDCCH monitoring occasions starting from the $1^{st}$ PDCCH monitoring occasion for paging in the paging frame (or from the start of the paging frame) are sequentially numbered from 0. The first PDCCH monitoring occasion number for the first PO can be signaled by the gNB. The gNB can also signal an offset between the starting PDCCH monitoring occasion of each PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from $P\text{-}^{th}$ PDCCH monitoring occasions for paging.

A 2nd PO is set of X consecutive PDCCH monitoring occasions starting from $(P+O)\text{-}^{th}$ PDCCH monitoring occasions for paging.

A 3rd PO is set of X consecutive PDCCH monitoring occasions starting from $(P+2O)\text{-}^{th}$ PDCCH monitoring occasions for paging.

An $4^{th}$ PO is set of X consecutive PDCCH monitoring occasions starting from (P+3O) PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) are sequentially numbered from 0. The first PDCCH monitoring occasion number for the first PO can be signaled by the gNB. The gNB can also signal an offset between the last PDCCH monitoring occasion of a PO and a starting PDCCH monitoring occasion of the next PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from $P\text{-}^{th}$ PDCCH monitoring occasions for paging.

A 2nd PO is set of X consecutive PDCCH monitoring occasions starting from $(P+X+O)\text{-}^{th}$ PDCCH monitoring occasions for paging.

A 3rd PO is set of X consecutive PDCCH monitoring occasions starting from $(P+2X+2O)\text{-}^{th}$ PDCCH monitoring occasions for paging.

A $4^{th}$ PO is set of X consecutive PDCCH monitoring occasions starting from $(P+3X+3O)\text{-}^{th}$ PDCCH monitoring occasions for paging and so on.

Where X is a number of SSBs. In one embodiment, X is maximum number of SSBs (i.e., L). In another embodiment, X is equal to actual transmitted SSBs. In an embodiment, whether X is the actual transmitted SSBs or not can be indicated by the network in the system information.

Alternately, the slot index for first PO can be signaled by the gNB. The gNB can also signal an offset between the starting slot of each PO. For example, if Ns is equal to 4, then the i_s values will be 0 to 3 and there are four POs. The gNB can signal slot index (S) of the first PO and an offset O.

A 1st PO is set of X consecutive PDCCH monitoring occasions starting from $1^{st}$ PDCCH monitoring occasion in slot S of paging frame.

A 2nd PO is set of X consecutive PDCCH monitoring occasions starting from $1^{st}$ PDCCH monitoring occasion in slot S+O.

A 3rd PO is set of X consecutive PDCCH monitoring occasions starting from $1^{st}$ PDCCH monitoring occasion in slot S+2O.

A 4th PO is set of X consecutive PDCCH monitoring occasions starting from $1^{st}$ PDCCH monitoring occasion in slot S+3O and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 2: The Paging search space is configured by the gNB, wherein the searchSpaceId zero is configured for the Paging Search Space. The UE determines the RMSI pattern from the RMSI configuration signaled by the gNB.

If RMSI pattern is 2 or 3,

A $1^{st}$ PO is the set of PDCCH monitoring occasions for the RMSI in the $1^{st}$ half frame of the determined PF.

A $2^{nd}$ PO is the set of PDCCH monitoring occasions for the RMSI in the $2^{nd}$ half frame of the determined PF.

If RMSI pattern is 1,

A $1^{st}$ PO is the set of PDCCH monitoring occasions for the RMSI, wherein the $1^{st}$ PDCCH monitoring occasion starts in the determined PF.

Option 3: The Paging search space is configured by the gNB, wherein the searchSpaceId zero is configured for the Paging Search Space If the paging search space with the search space Id zero is configured by the gNB, the PDCCH monitoring occasions for paging are same as the PDCCH monitoring occasions for the RMSI. Based on the RMSI configuration, the UE knows the PDCCH monitoring occasions for paging in the determined PF and the subsequent radio frames. The UE knows the 1st PDCCH monitoring occasion for paging in the PF and also the subsequent PDCCH monitoring occasions for paging.

The PDCCH monitoring occasions starting from the 1st PDCCH monitoring occasion for paging in the paging frame (or from the start of PF) are sequentially numbered from 0.

A 1st PO is set of X consecutive PDCCH monitoring occasions starting from 0-$^{th}$ PDCCH monitoring occasions for paging.

A 2nd PO is set of X consecutive PDCCH monitoring occasions starting from X-$^{th}$ PDCCH monitoring occasions for paging.

A 3rd PO is set of X consecutive PDCCH monitoring occasions starting from 2X-$^{th}$ PDCCH monitoring occasions for paging.

An ith PO is set of X consecutive PDCCH monitoring occasions starting from (i*X)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions starting from the 1st PDCCH monitoring occasion for paging in the paging frame (or from the start of the PF) are sequentially numbered from 1.

A 1st PO is set of X consecutive PDCCH monitoring occasions starting from $1^{st}$ PDCCH monitoring occasions for paging.

A 2nd PO is set of X consecutive PDCCH monitoring occasions starting from X+1-$^{th}$ PDCCH monitoring occasions for paging.

A 3rd PO is set of X consecutive PDCCH monitoring occasions starting from 2X+1-$^{th}$ PDCCH monitoring occasions for paging.

ith PO is set of X consecutive PDCCH monitoring occasions starting from [(i−1)*X)]+1-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 4: Subframes or slots corresponding to each PO is pre-defined as in LTE.

Embodiment 8

Figure 8:
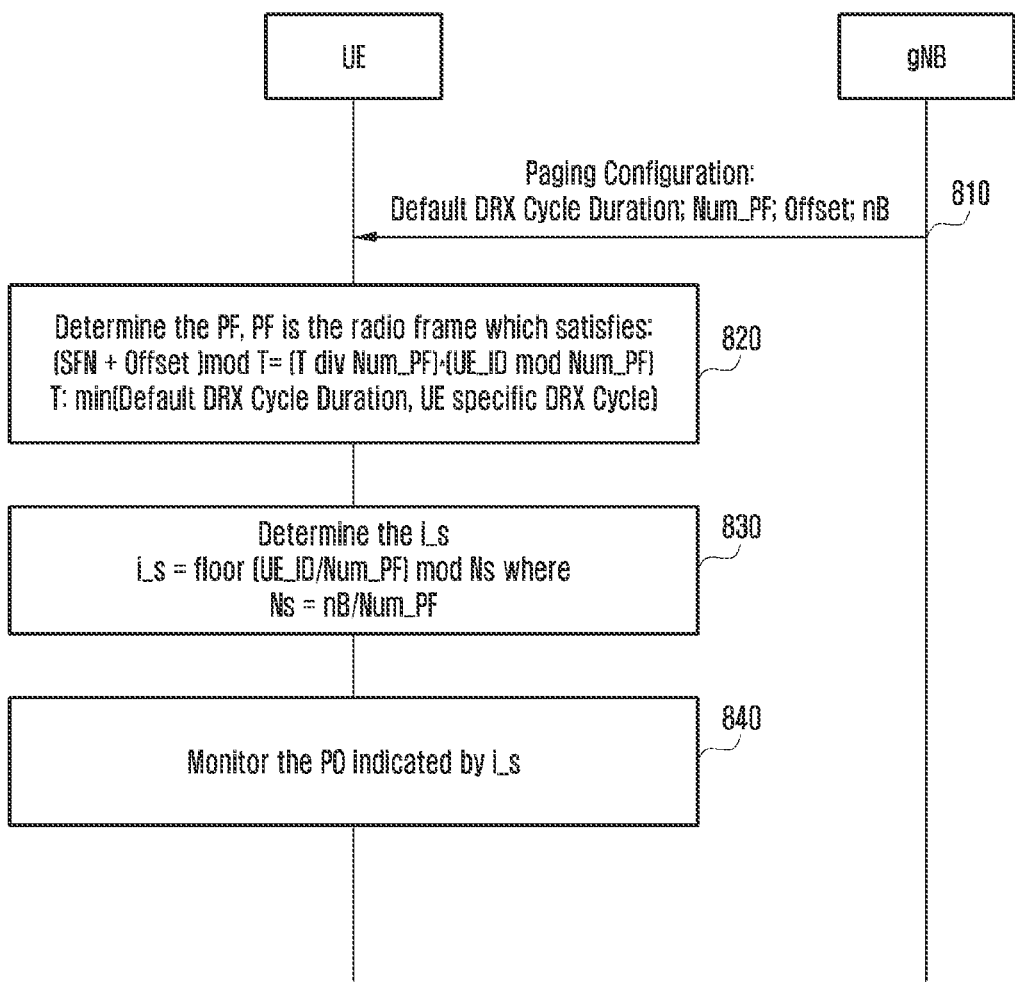
FIG. 8 illustrates another example of determining PO according to an embodiment of the disclosure.

FIG. 8 illustrates another example of determining PO according to an embodiment of the disclosure.

Referring to FIG. 8:

0) The UE acquires the paging configuration (Default DRX Cycle Duration, Num_PF, nB, Offset), the paging search space configuration (if signaled by the network) and the RMSI configuration (RMSI search space, RMSI pattern info: Pattern 1, 2, 3) from the system information signaled by the network (810). The RMSI is also be referred as SIB1. The RMSI pattern is also referred as the SS/PBCH block and CORESET multiplexing pattern. In the RRC Connected State, the paging search space configuration is signaled by the network for one or more configured BWP(s) in the dedicated signaling and the UE uses the paging search space configuration of its active DL BWP.

1) The UE first derives a Paging frame (820). The paging frame is the radio frame with the SFN which satisfies Equation 22:

$$(\text{SFN}+\text{offset})\bmod T = (T \text{ div Num\_PF})*(\text{UE\_ID} \bmod \text{Num\_PF}) \quad \text{Equation 22}$$

Where,

T: DRX cycle of the UE. T is determined by the shortest of the UE specific DRX values, if configured by the RRC or by the upper layers (e.g. NAS), and a default DRX value signaled in the system information. If the UE specific DRX is not configured by the RRC or by the upper layers, the default value is applied.

Num_PF: the number of paging frames in the DRX cycle. The Num_PF is signaled by the gNB in the system information. The values of the Num_PF can be T, T/2, T/4, T/8, T/16, T/32 and so on.

In an example, the UE_ID can be {IMSI mod 1024} or {5G-S-TMSI mod 1024}.

The paging frame is the radio frame with respect to which the UE determines its PO. A PO associated with a PF may start in the PF or after the PF. A PO which starts in the paging frame may end in the subsequent radio frame.

2) The UE then calculates an index i_s (830), where i_s is derived from the following Equation 23:

$$i\_s = \text{floor}(\text{UE\_ID}/\text{Num\_PF}) \bmod Ns, \text{ where} \quad \text{Equation 23}$$

Ns: nB/Num_PF. Ns*Num_PF indicates the total number of POs in DRX cycle.

nB: Total number of POs in DRX cycle.

In an example, the UE_ID can be {IMSI mod 1024} or {5G-S-TMSI mod 1024}.

3) The UE monitors the PO indicated by i_s (840). If i_s=0, the UE monitors the 1st PO; If i_s=1, the UE monitors the 2nd PO; If i_s=2, the UE monitors the 3rd PO; and so on.

4) The UE determines the PDCCH monitoring occasions corresponding to the PO indicated by i_s as follows:

Option 1: The Paging Search Space is configured by the gNB, wherein the searchSpaceId other than zero is configured for the Paging Search Space The gNB may signal the paging search space configuration (comprising at least one of parameters Monitoringperiodicity-PDCCH-slot, Monitoring-offset-PDCCH-slot, Monitoring-symbols-PDCCH-within-slot and duration). The UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. The PDCCH monitoring occasions are there in the slots 'x' to x+duration, where the slot with number 'x' in a radio frame with number 'y' satisfies the Equation 24:

$$(y*(\text{number of slots in a radio frame})+x-\text{Monitoring-offset-PDCCH-slot}) \bmod (\text{Monitoring-periodicity-PDCCH-slot})=0; \quad \text{Equation 24}$$

The starting symbol of a PDCCH monitoring occasion in each slot having the PDCCH monitoring occasion is given by Monitoring-symbols-PDCCH-within-slot. The length (in symbols) of a PDCCH monitoring occasion is given in the corset associated with the search space.

If the paging search space is configured by the gNB, wherein the searchSpaceId other than zero is configured for the Paging Search Space, based on the paging search space configuration (comprising at least one of parameters Monitoring-periodicity-PDCCH-slot, Monitoring-offset-PDCCH-slot, Monitoring-symbols-PDCCH-within-slot and duration), the UE knows the PDCCH monitoring occasions for paging in the determined PF and the subsequent radio frames. The UE knows the 1st PDCCH monitoring occasion for paging in the determined PF and also the subsequent PDCCH monitoring occasions.

The PDCCH monitoring occasions for paging from the start of the determined PF are sequentially numbered from 0. In other words, the PDCCH monitoring occasions starting from the $1^{st}$ PDCCH monitoring occasion for paging in the paging frame (or from the start of PF) are sequentially numbered from 0. The maximum number (L) of SSBs per frequency band is pre-defined. The gNB signals the information (SSBPositionsInBurst) related to actual transmitted SSBs in the system information.

A 1st PO is set of X consecutive PDCCH monitoring occasions starting from 0-$^{th}$ PDCCH monitoring occasions for paging.

A 2nd PO is set of X consecutive PDCCH monitoring occasions starting from X-$^{th}$ PDCCH monitoring occasions for paging.

A 3rd PO is set of X consecutive PDCCH monitoring occasions starting from 2X-$^{th}$ PDCCH monitoring occasions for paging.

An ith PO is set of X consecutive PDCCH monitoring occasions starting from (i*X)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 1. In other words, the PDCCH monitoring occasions starting from the $1^{st}$ PDCCH monitoring occasion for paging in the paging frame (or from the start of PF) are sequentially numbered from 1. The maximum number (L) of SSBs per frequency band is pre-defined. The gNB signals the information (SSBPositionsInBurst) related to the actual transmitted SSBs in the system information.

A 1st PO is set of X consecutive PDCCH monitoring occasions starting from $1^{st}$ PDCCH monitoring occasions for paging.

A 2nd PO is set of X consecutive PDCCH monitoring occasions starting from X+1-$^{th}$ PDCCH monitoring occasions for paging.

A 3rd PO is set of X consecutive PDCCH monitoring occasions starting from 2X+1-$^{th}$ PDCCH monitoring occasions for paging and so on.

An ith PO is set of X consecutive PDCCH monitoring occasions starting from [(i−1)*X)]+1-$^{th}$ PDCCH monitoring occasions for paging.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) is sequentially numbered from 0. The first PDCCH monitoring occasion number for each PO can be signaled by the gNB. For example, if Ns is equal to 4, then the i_s values will be 0 to 3 and there are four POs. The gNB can signal PDCCH monitoring occasion numbers (P, Q, R, S) one corresponding to each of the POs.

A 1st PO is set of X consecutive PDCCH monitoring occasions starting from P-$^{th}$ PDCCH monitoring occasions for paging.

A 2nd PO is set of X consecutive PDCCH monitoring occasions starting from Q-$^{th}$ PDCCH monitoring occasions for paging.

A 3rd PO is set of X consecutive PDCCH monitoring occasions starting from R-$^{th}$ PDCCH monitoring occasions for paging.

A $4^{th}$ PO is set of X consecutive PDCCH monitoring occasions starting from S-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information. In an embodiment, each PO can comprise of 'R' sub POs where each sub PO consists of 'X' PDCCH monitoring occasions, X is number of SSBs; in one embodiment X is maximum number of SSBs i.e. L; in another embodiment X is equal to actual transmitted SSBs. The number of sub POs i.e. R is also signaled by gNB. In its PO (identified by PO index) UE may monitor one or more sub POs. The starting PDCCH monitoring occasion number of each of these sub POs of a PO is signaled by gNB. Alternately, an offset 'O' can be signaled between the sub POs. The starting PDCCH occasions number of $1^{st}$ sub PO is the starting PDCCH occasions number of PO. Let's say starting PDCCH monitoring occasion number of PO is P and offset is O. $1^{st}$ sub PO is a set of X consecutive PDCCH monitoring occasions starting from Pth PDCCH monitoring occasions for paging. $2^{nd}$ sub PO is a set of X consecutive PDCCH monitoring occasions starting from (P+X+O)th PDCCH monitoring occasion for paging. $3^{rd}$ sub PO is a set of X consecutive PDCCH monitoring occasions starting from (P+2X+2O)th PDCCH monitoring occasion for paging and so on.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) are sequentially numbered from 0. The first PDCCH monitoring occasion number for the first PO can be signaled by the gNB. The gNB can also signal an offset between the starting PDCCH monitoring occasion of each PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from $P\text{-}^{th}$ PDCCH monitoring occasions for paging.

A 2nd PO is set of X consecutive PDCCH monitoring occasions starting from $(P+O)\text{-}^{th}$ PDCCH monitoring occasions for paging.

A 3rd PO is set of X consecutive PDCCH monitoring occasions starting from $(P+2O)\text{-}^{th}$ PDCCH monitoring occasions for paging.

A $4^{th}$ PO is set of X consecutive PDCCH monitoring occasions starting from $(P+3O)\text{-}^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the $1^{st}$ PDCCH monitoring occasion for paging in the paging frame (or from the start of the paging frame) are sequentially numbered from 0. The first PDCCH monitoring occasion number for the first PO can be signaled by the gNB. The gNB can also signal an offset between the last PDCCH monitoring occasion of a PO and starting the PDCCH monitoring occasion of the next PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from $P\text{-}^{th}$ PDCCH monitoring occasions for paging.

A 2nd PO is set of X consecutive PDCCH monitoring occasions starting from $(P+X+O)\text{-}^{th}$ PDCCH monitoring occasions for paging.

A 3rd PO is set of X consecutive PDCCH monitoring occasions starting from $(P+2X+2O)\text{-}^{th}$ PDCCH monitoring occasions for paging.

A $4^{th}$ PO is set of X consecutive PDCCH monitoring occasions starting from $(P+3X+3O)\text{-}^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the slot index for first PO can be signaled by the gNB. The gNB can also signal an offset between the starting slot of each PO. For example, if Ns is equal to 4, then the i_s values will be 0 to 3 and there are four POs. The gNB can signal slot index (S) of the first PO and an offset O.

A 1st PO is set of X consecutive PDCCH monitoring occasions starting from $1^{st}$ PDCCH monitoring occasion in slot S of paging frame.

A 2nd PO is set of X consecutive PDCCH monitoring occasions starting from $1^{st}$ PDCCH monitoring occasion in slot S+O.

A 3rd PO is set of X consecutive PDCCH monitoring occasions starting from $1^{st}$ PDCCH monitoring occasion in slot S+2O.

A $4^{th}$ PO is set of X consecutive PDCCH monitoring occasions starting from $1^{st}$ PDCCH monitoring occasion in slot S+3O and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 2: The paging search space is configured by the gNB, wherein the searchSpaceId zero is configured for the Paging Search Space The UE determines the RMSI pattern from the RMSI configuration signaled by the gNB.

If RMSI pattern is 2 or 3,

The 1st PO is the set of PDCCH monitoring occasions for the RMSI in the $1^{st}$ half frame of the determined PF.

The $2^{nd}$ PO is the set of PDCCH monitoring occasions for the RMSI in the $2^{nd}$ half frame of the determined PF.

If RMSI pattern is 1,

A $1^{st}$ PO is the set of PDCCH monitoring occasions for the RMSI, wherein the $1^{st}$ PDCCH monitoring occasion starts in the determined PF.

Option 3: The paging search space is configured by the gNB, wherein the searchSpaceId zero is configured for the Paging Search Space If the paging search space with the search space Id zero is configured by the gNB, the PDCCH monitoring occasions for paging are same as the PDCCH monitoring occasions for the RMSI. Based on the RMSI configuration, the UE knows the PDCCH monitoring occasions for paging in the determined PF and the subsequent radio frames. The UE knows the 1st PDCCH monitoring occasion for paging in the PF and also the subsequent PDCCH monitoring occasions for paging.

The PDCCH monitoring occasions starting from the 1st PDCCH monitoring occasion for paging in the paging frame (or from the start of PF) are sequentially numbered from 0.

A 1st PO is set of X consecutive PDCCH monitoring occasions starting from $0\text{-}^{th}$ PDCCH monitoring occasions for paging.

A 2nd PO is set of X consecutive PDCCH monitoring occasions starting from $X\text{-}^{th}$ PDCCH monitoring occasions for paging.

A 3rd PO is set of X consecutive PDCCH monitoring occasions starting from $2X\text{-}^{th}$ PDCCH monitoring occasions for paging.

An ith PO is set of X consecutive PDCCH monitoring occasions starting from $(i*X)\text{-}^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions starting from the 1st PDCCH monitoring occasion for paging in the paging frame (or from the start of PF) are sequentially numbered from 1.

A 1st PO is set of X consecutive PDCCH monitoring occasions starting from $1^{st}$ PDCCH monitoring occasions for paging.

A 2nd PO is set of X consecutive PDCCH monitoring occasions starting from $X+1\text{-}^{th}$ PDCCH monitoring occasions for paging.

A 3rd PO is set of X consecutive PDCCH monitoring occasions starting from $2X+1\text{-}^{th}$ PDCCH monitoring occasions for paging.

An ith PO is set of X consecutive PDCCH monitoring occasions starting from $[(i-1)*X)]+1\text{-}^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 4: Subframes or slots corresponding to each PO is pre-defined as in LTE.

Embodiment 9

Figure 9:
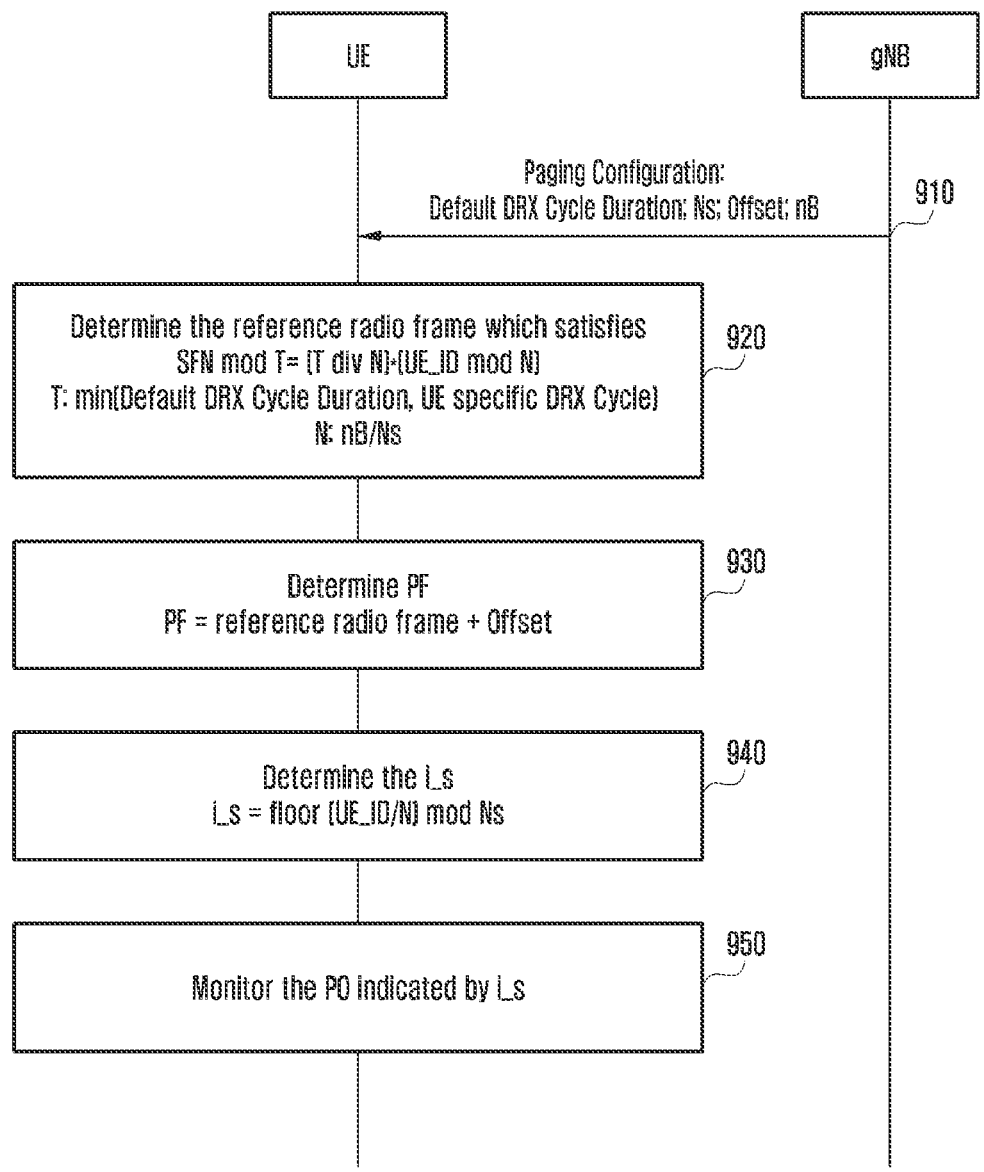
FIG. 9 illustrates another example of determining PO according to an embodiment of the disclosure.

FIG. 9 illustrates another example of determining PO according to an embodiment of the disclosure.

Referring to FIG. 9:

0) The UE acquires the paging configuration (Default DRX Cycle Duration, Ns, nB, Offset), the paging search space configuration (if signaled by the network) and the RMSI configuration (RMSI search space, RMSI pattern info: Pattern 1, 2, 3) from the system information signaled by the network (910). The RMSI is also be referred as SIB1. The RMSI pattern is also referred as the SS/PBCH block and the CORESET multiplexing pattern. In the RRC Connected State, the paging search space configuration is signaled by the network for one or more configured BWP(s) in dedicated signaling and the UE uses the paging search space configuration of its active DL BWP.

1) The UE first derives a reference radio frame (920). The reference frame is the radio frame with the SFN which satisfies following Equation 25:

$$\text{SFN mod } T = (T \text{ div } N)*(UE\_ID \text{ mod } N) \quad \text{Equation 25}$$

Where,

T: DRX cycle of the UE. T is determined by the shortest of the UE specific DRX values, if configured by the RRC or by the upper layers (e.g. NAS), and a default DRX value signaled in the system information. If the UE specific DRX is not configured by the RRC or by upper layers, the default value is applied.

nB: number of POs in DRX cycle. nB is signaled by the gNB in the system information. The values of nB can be 4T, 2T, T, T/2, T/4, T/8, T/16, T/32 and so on.

N: nB/Ns

2) The UE then determines the paging frame, where the paging frame is the radio frame having the SFN equal to 'SFN of reference frame+offset' (930). The Parameter Offset is signalled by the gNB in the system information. The offset is in units of the radio frames.

For example, if the determined reference frame is SFN 'X' and the offset signalled by the network is 'Y', paging frame is the radio frame where the SFN equals X+Y.

The paging frame is the radio frame with respect to which the UE determines its PO. A PO associated with a PF may start in the PF or after the PF. A PO which starts in the paging frame may end in the subsequent radio frame.

3) The UE then calculates an index i_s (940), where i_s is derived from the following Equation 26:

$$i\_s = \text{floor}(UE\_ID/N) \text{ mod } Ns, \text{ where} \quad \text{Equation 26}$$

N=nB/Ns

In an example, the UE_ID can be {IMSI mod 1024} or {5G-S-TMSI mod 1024}.

4) The UE monitors the PO indicated by i_s (950). If i_s=0, the UE monitors the 1st PO; If i_s=1, the UE monitors the 2nd PO; If i_s=2, the UE monitors the 3rd PO; and so on.

5) The UE determines the PDCCH monitoring occasions corresponding to the PO indicated by i_s as follows:

Option 1: The Paging Search Space is configured by the gNB, wherein the searchSpaceId other than zero is configured for the Paging Search Space The gNB may signal the paging search space configuration (comprising at least one of parameters Monitoring-periodicity-PDCCH-slot, Monitoring-offset-PDCCH-slot, Monitoring-symbols-PDCCH-within-slot and duration). The UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. PDCCH monitoring occasions are there in slots 'x' to x+duration, where the slot with the number 'x' in a radio frame with number 'y' satisfies the Equation 27:

$$(y*(\text{number of slots in a radio frame}) + x - \text{Monitoring-offset-PDCCH-slot}) \text{ mod } (\text{Monitoring-periodicity-PDCCH-slot}) = 0; \quad \text{Equation 27}$$

The starting symbol of a PDCCH monitoring occasion in each slot having the PDCCH monitoring occasion is given by Monitoring-symbols-PDCCH-within-slot. The length (in symbols) of a PDCCH monitoring occasion is given in the corset associated with the search space.

If the paging search space is configured by the gNB, wherein the searchSpaceId other than zero is configured for the Paging Search Space, based on paging search space configuration (comprising at least one of parameters Monitoring-periodicity-PDCCH-slot, Monitoring-offset-PDCCH-slot, Monitoring-symbols-PDCCH-within-slot and duration), the UE knows the PDCCH monitoring occasions for paging in the determined PF and the subsequent radio frames. The UE knows the 1st PDCCH monitoring occasion for paging in the determined PF and also the subsequent PDCCH monitoring occasions.

The PDCCH monitoring occasions for paging from the start of the determined PF are sequentially numbered from 0. In other words, the PDCCH monitoring occasions starting from the 1st PDCCH monitoring occasion for paging in the paging frame is sequentially numbered from 0. The maximum number (L) of SSBs per frequency band is pre-defined. The gNB signals the information (SSBPositionsInBurst) related to actual transmitted SSBs in the system information.

A 1st PO is set of X consecutive PDCCH monitoring occasions starting from $0\text{-}^{th}$ PDCCH monitoring occasions for paging.

A 2nd PO is set of X consecutive PDCCH monitoring occasions starting from $X\text{-}^{th}$ PDCCH monitoring occasions for paging.

A 3rd PO is set of X consecutive PDCCH monitoring occasions starting from $2X\text{-}^{th}$ PDCCH monitoring occasions for paging.

An ith PO is set of X consecutive PDCCH monitoring occasions starting from $(i*X)\text{-}^{th}$ PDCCH monitoring occasions for paging and so on.

Where X is a number of SSBs. In one embodiment, X is a maximum number of SSBs (i.e., L). In another embodiment X, is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 1. In other words, the PDCCH monitoring occasions starting from the 1st PDCCH monitoring occasion for paging in the paging frame (or from the start of PF) is sequentially numbered from 1. The maximum number (L) of SSBs per frequency band is pre-defined. The gNB signals the information (SSBPositionsInBurst) related to the actual transmitted SSBs in the system information.

A 1st PO is set of X consecutive PDCCH monitoring occasions starting from $1^{st}$ PDCCH monitoring occasions for paging.

A 2nd PO is set of X consecutive PDCCH monitoring occasions starting from X+1-$^{th}$ PDCCH monitoring occasions for paging.

A 3rd PO is set of X consecutive PDCCH monitoring occasions starting from 2X+1-$^{th}$ PDCCH monitoring occasions for paging.

An ith PO is set of X consecutive PDCCH monitoring occasions starting from [(i−1)*X)]+1-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the $1^{st}$ PDCCH monitoring occasion for paging in the paging frame (or from the start of the paging frame) is sequentially numbered from 0. The first PDCCH monitoring occasion number for each PO can be signaled by the gNB. For example, if Ns is equal to 4, then the i_s values will be 0 to 3 and there are four POs. The gNB can signal the PDCCH monitoring occasion numbers (P, Q, R, S) one corresponding to each of the POs.

A 1st PO is set of X consecutive PDCCH monitoring occasions starting from P-$^{th}$ PDCCH monitoring occasions for paging.

A 2nd PO is set of X consecutive PDCCH monitoring occasions starting from Q-$^{th}$ PDCCH monitoring occasions for paging.

A 3rd PO is set of X consecutive PDCCH monitoring occasions starting from R-$^{th}$ PDCCH monitoring occasions for paging.

A $4^{th}$ PO is set of X consecutive PDCCH monitoring occasions starting from S-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information. In an embodiment, each PO can comprise of 'R' sub POs where each sub PO consists of 'X' PDCCH monitoring occasions, X is number of SSBs; in one embodiment X is maximum number of SSBs i.e. L; in another embodiment X is equal to actual transmitted SSBs. The number of sub POs i.e. R is also signaled by gNB. In its PO (identified by PO index) UE may monitor one or more sub POs. The starting PDCCH monitoring occasion number of each of these sub POs of a PO is signaled by gNB. Alternately, an offset 'O' can be signaled between the sub POs. The starting PDCCH occasions number of 1st sub PO is the starting PDCCH occasions number of PO. Let's say starting PDCCH monitoring occasion number of PO is P and offset is O. $1^{st}$ sub PO is a set of X consecutive PDCCH monitoring occasions starting from Pth PDCCH monitoring occasions for paging. $2^{nd}$ sub PO is a set of X consecutive PDCCH monitoring occasions starting from (P+X+O)th PDCCH monitoring occasion for paging. 3rd sub PO is a set of X consecutive PDCCH monitoring occasions starting from (P+2X+2O)th PDCCH monitoring occasion for paging and so on.

Alternately, the PDCCH monitoring occasions for paging from the start of the determined PF are sequentially numbered from 0. In other words, the PDCCH monitoring occasions starting from the $1^{st}$ PDCCH monitoring occasion for paging in the paging frame (or from the start of the paging frame) is sequentially numbered from 0. The first PDCCH monitoring occasion number for the first PO can be signaled by the gNB. The gNB can also signal an offset between the starting PDCCH monitoring occasion of each PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+O)-$^{th}$ PDCCH monitoring occasions for paging.

A 3rd PO is set of X consecutive PDCCH monitoring occasions starting from (P+2O)-$^{th}$ PDCCH monitoring occasions for paging.

A $4^{th}$ PO is set of X consecutive PDCCH monitoring occasions starting from (P+3O) PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) are sequentially numbered from 0. The first PDCCH monitoring occasion number for the first PO can be signaled by the gNB. The gNB can also signal an offset between the last PDCCH monitoring occasion of a PO and starting the PDCCH monitoring occasion of the next PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+X+O)-$^{th}$ PDCCH monitoring occasions for paging.

A 3rd PO is set of X consecutive PDCCH monitoring occasions starting from (P+2X+2O)-$^{th}$ PDCCH monitoring occasions for paging.

A $4^{th}$ PO is set of X consecutive PDCCH monitoring occasions starting from (P+3X+3O)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the slot index for the first PO can be signaled by the gNB. The gNB can also signal an offset between the starting slot of each PO. For example, if Ns is equal to 4, then the i_s values will be 0 to 3 and there are four POs. The gNB can signal slot index (S) of the first PO and an offset O.

A 1st PO is set of X consecutive PDCCH monitoring occasions starting from $1^{st}$ PDCCH monitoring occasion in slot S of paging frame.

A 2nd PO is set of X consecutive PDCCH monitoring occasions starting from $1^{st}$ PDCCH monitoring occasion in slot S+O.

A 3rd PO is set of X consecutive PDCCH monitoring occasions starting from $1^{st}$ PDCCH monitoring occasion in slot S+2O.

A $4^{th}$ PO is set of X consecutive PDCCH monitoring occasions starting from $1^{st}$ PDCCH monitoring occasion in slot S+3O and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 2: The paging search space is configured by the gNB, wherein the searchSpaceId zero is configured for the Paging Search Space The UE determines the RMSI pattern from the RMSI configuration signaled by the gNB.

If RMSI pattern is 2 or 3,
  A 1st PO is the set of PDCCH monitoring occasions for the RMSI in the $1^{st}$ half frame of the determined PF.
  A $2^{nd}$ PO is the set of PDCCH monitoring occasions for the RMSI in the $2^{nd}$ half frame of the determined PF.
If RMSI pattern is 1,
  A $1^{st}$ PO is the set of PDCCH monitoring occasions for the RMSI, wherein the $1^{st}$ PDCCH monitoring occasion starts in the determined PF.

Option 3: The paging search space is configured by the gNB, wherein the searchSpaceId zero is configured for the Paging Search Space.

If the paging search space with the search space Id zero is configured by the gNB, the PDCCH monitoring occasions for paging are same as the PDCCH monitoring occasions for the RMSI. Based on the RMSI configuration, the UE knows the PDCCH monitoring occasions for paging in the determined PF and subsequent radio frames. The UE knows the 1st PDCCH monitoring occasion for paging in the PF and also the subsequent PDCCH monitoring occasions for paging.

The PDCCH monitoring occasions starting from the 1st PDCCH monitoring occasion for paging in the paging frame (or from the start of the PF) are sequentially numbered from 0.

A 1st PO is set of X consecutive PDCCH monitoring occasions starting from 0-$^{th}$ PDCCH monitoring occasions for paging.

A 2nd PO is set of X consecutive PDCCH monitoring occasions starting from X-$^{th}$ PDCCH monitoring occasions for paging.

A 3rd PO is set of X consecutive PDCCH monitoring occasions starting from 2X-$^{th}$ PDCCH monitoring occasions for paging.

An ith PO is set of X consecutive PDCCH monitoring occasions starting from (i*X)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions starting from the 1st PDCCH monitoring occasion for paging in the paging frame (or from the start of the PF) are sequentially numbered from 1.

A 1st PO is set of X consecutive PDCCH monitoring occasions starting from $1^{st}$ PDCCH monitoring occasions for paging.

A 2nd PO is set of X consecutive PDCCH monitoring occasions starting from X+1-$^{th}$ PDCCH monitoring occasions for paging.

A 3rd PO is set of X consecutive PDCCH monitoring occasions starting from 2X+1-$^{th}$ PDCCH monitoring occasions for paging.

An ith PO is set of X consecutive PDCCH monitoring occasions starting from [(i−1)*X)]+1-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 4: Subframes or slots corresponding to each PO is pre-defined as in LTE.

Embodiment 10

Figure 10:
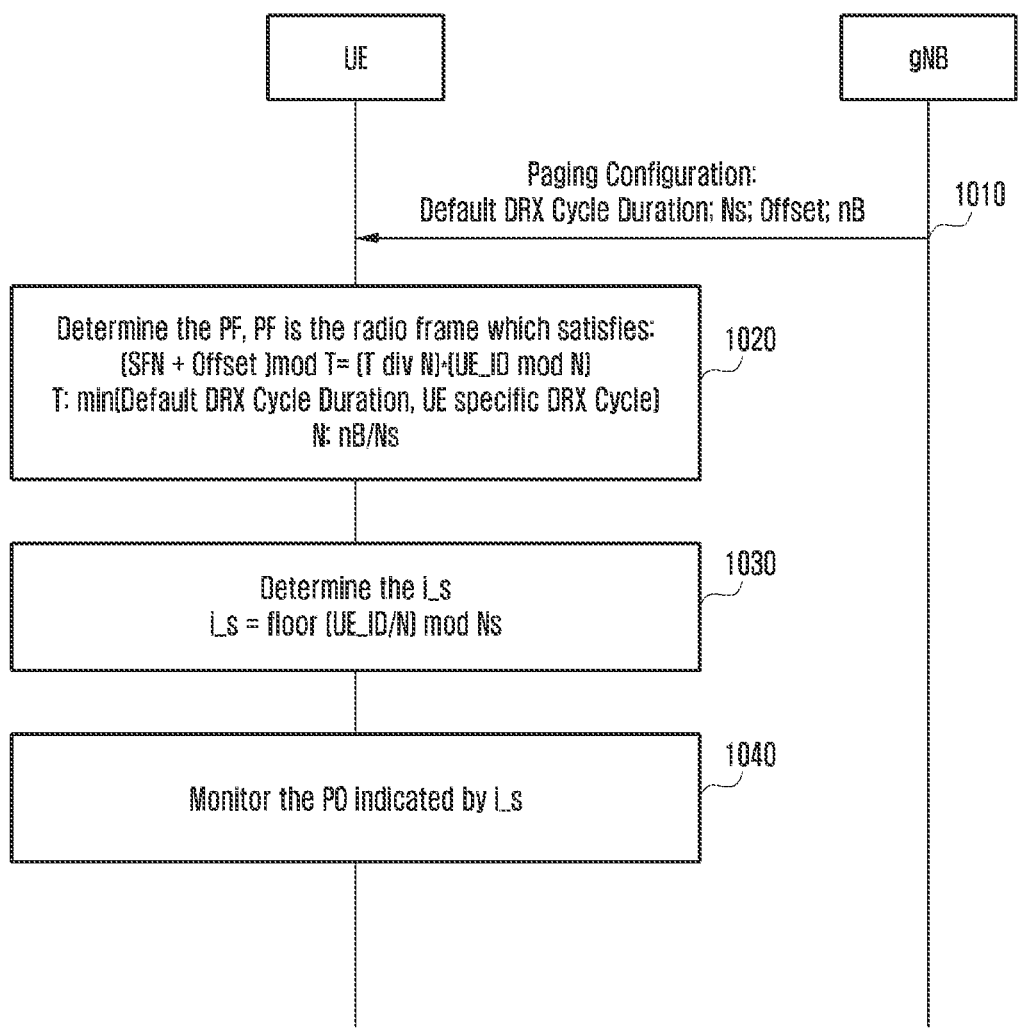
FIG. 10 illustrates another example of determining PO according to an embodiment of the disclosure.

FIG. 10 illustrates another example of determining according to an embodiment of the disclosure.

Referring to FIG. 10:

0) The UE acquires the paging configuration (Default DRX Cycle Duration, Ns, nB, Offset), the paging search space configuration (if signaled by the network) and the RMSI configuration (RMSI search space, RMSI pattern info: Pattern 1, 2, 3) from the system information signaled by the network (1010). The RMSI is also be referred as SIB1. The RMSI pattern is also referred as the SS/PBCH block and the CORESET multiplexing pattern. In the RRC Connected State, the paging search space configuration is signaled by the network for one or more configured BWP(s) in dedicated signaling and the UE uses the paging search space configuration of its active DL BWP.

1) The UE first derives a Paging frame (1020). The paging frame is the radio frame with the SFN which satisfies following Equation 28:

$$(SFN+\text{offset}) \bmod T = (T \text{ div } Num\_PF)*(UE\_ID \bmod Num\_PF) \qquad \text{Equation 28}$$

Where,

T: DRX cycle of the UE. T is determined by the shortest of the UE specific DRX values, if configured by the RRC or by the upper layers (e.g. NAS), and a default DRX value signaled in the system information. If the UE specific DRX is not configured by the RRC or by the upper layers, the default value is applied.

nB: number of POs in DRX cycle. nB is signaled by the gNB in the system information. The values of nB can be 4T, 2T, T, T/2, T/4, T/8, T/16, T/32 and so on.

N: nB/Ns

In an example, the UE_ID can be {IMSI mod 1024} or {5G-S-TMSI mod 1024}.

The paging frame is the radio frame with respect to which the UE determines its PO. A PO associated with a PF may start in the PF or after the PF. A PO which starts in the paging frame may end in the subsequent radio frame.

2) The UE then calculates an index i_s (1030), where i_s is derived from the following Equation 29:

$$i\_s = \text{floor}(UE\_ID/Num\_PF) \bmod Ns, \text{ where} \quad \text{Equation 29}$$

N: nB/Ns

In an example, the UE_ID can be {IMSI mod 1024} or {5G-S-TMSI mod 1024}.

3) The UE monitors the PO indicated by i_s (1040). If i_s=0, the UE monitors the 1st PO; If i_s=1, the UE monitors the 2nd PO; If i_s=2, the UE monitors the 3rd PO; and so on.

UE determines the PDCCH monitoring occasions corresponding to the PO indicated by i_s as follows:

Option 1: The paging Search Space is configured by the gNB, wherein the searchSpaceId other than zero is configured for the Paging Search Space.

The gNB may signal paging search space configuration (comprising at least one of parameters Monitoring-periodicity-PDCCH-slot, Monitoring-offset-PDCCH-slot, Monitoring-symbols-PDCCH-within-slot and duration). The UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. The PDCCH monitoring occasions are there in slots 'x' to x+duration, where the slot with number 'x' in a radio frame with number 'y' satisfies the Equation 30:

$$(y*(\text{number of slots in a radio frame})+x-\text{Monitoring-offset-PDCCH-slot}) \bmod (\text{Monitoring-periodicity-PDCCH-slot})=0; \quad \text{Equation 30}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space.

If the paging search space is configured by the gNB, wherein the searchSpaceId other than zero is configured for the Paging Search Space, based on the paging search space configuration (comprising at least one of parameters Monitoring-periodicity-PDCCH-slot, Monitoring-offset-PDCCH-slot, Monitoring-symbols-PDCCH-within-slot and duration), the UE knows the PDCCH monitoring occasions for paging in the determined PF and the subsequent radio frames. The UE knows the 1st PDCCH monitoring occasion for paging in the determined PF and also the subsequent PDCCH monitoring occasions.

The PDCCH monitoring occasions for paging from the start of the determined PF are sequentially numbered from 0. In other words, the PDCCH monitoring occasions starting from the 1st PDCCH monitoring occasion for paging in the paging frame (or from the start of PF) is sequentially numbered from 0. The maximum number (L) of SSBs per frequency band is pre-defined. The gNB signals the information (SSBPositionsInBurst) related to the actual transmitted SSBs in the system information.

A 1st PO is set of X consecutive PDCCH monitoring occasions starting from $0\text{-}^{th}$ PDCCH monitoring occasions for paging.

A 2nd PO is set of X consecutive PDCCH monitoring occasions starting from $X\text{-}^{th}$ PDCCH monitoring occasions for paging.

A 3rd PO is set of X consecutive PDCCH monitoring occasions starting from $2X\text{-}^{th}$ PDCCH monitoring occasions for paging.

An ith PO is set of X consecutive PDCCH monitoring occasions starting from $(i*X)\text{-}^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately the PDCCH monitoring occasions for paging from the start of the determined PF are sequentially numbered from 1. In other words, the PDCCH monitoring occasions starting from the 1st PDCCH monitoring occasion for paging in the paging frame (or from the start of PF) are sequentially numbered from 1. The maximum number (L) of SSBs per frequency band is pre-defined. The gNB signals the information (SSBPositionsInBurst) related to the actual transmitted SSBs in the system information.

A 1st PO is set of X consecutive PDCCH monitoring occasions starting from $1^{st}$ PDCCH monitoring occasions for paging.

A 2nd PO is set of X consecutive PDCCH monitoring occasions starting from $X+1\text{-}^{th}$ PDCCH monitoring occasions for paging.

A 3rd PO is set of X consecutive PDCCH monitoring occasions starting from $2X+1\text{-}^{th}$ PDCCH monitoring occasions for paging.

An ith PO is set of X consecutive PDCCH monitoring occasions starting from $[(i-1)*X]+1\text{-}^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the $1^{st}$ PDCCH monitoring occasion for paging in the paging frame (or from the start of PF) are sequentially numbered from 0. The first PDCCH monitoring occasion number for each PO can be signaled by the gNB. For example, if Ns is equal to 4, then the i_s values will be 0 to 3 and there are four POs. The gNB can signal PDCCH monitoring occasion numbers (P, Q, R, S) one corresponding to each of the POs.

A 1st PO is set of X consecutive PDCCH monitoring occasions starting from $P\text{-}^{th}$ PDCCH monitoring occasions for paging.

A 2nd PO is set of X consecutive PDCCH monitoring occasions starting from $Q\text{-}^{th}$ PDCCH monitoring occasions for paging.

A 3rd PO is set of X consecutive PDCCH monitoring occasions starting from $R\text{-}^{th}$ PDCCH monitoring occasions for paging.

A $4^{th}$ PO is set of X consecutive PDCCH monitoring occasions starting from $S\text{-}^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information. In an embodiment, each PO can comprise of 'R' sub POs where each sub PO consists of 'X' PDCCH monitoring occasions, X is number of SSBs; in one embodiment X is maximum number of SSBs i.e. L; in another embodiment X is equal to actual transmitted SSBs. The number of sub POs i.e. R is also signaled by gNB. In its PO (identified by PO index) UE may monitor one or more sub POs. The starting PDCCH monitoring occasion number of each of these sub POs of a PO is signaled by gNB. Alternately, an offset 'O' can be signaled between the sub POs. The starting PDCCH occasions number of $1^{st}$ sub PO is the starting PDCCH occasions number of PO. Let's say starting PDCCH monitoring occasion number of PO is P and offset is O. $1^{st}$ sub PO is a set of X consecutive PDCCH monitoring occasions starting from Pth PDCCH monitoring occasions for paging. $2^{nd}$ sub PO is a set of X consecutive PDCCH monitoring occasions starting from (P+X+O)th PDCCH monitoring occasion for paging. $3^{rd}$ sub PO is a set of X consecutive PDCCH monitoring occasions starting from (P+2X+2O)th PDCCH monitoring occasion for paging and so on.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) are sequentially numbered from 0. The first PDCCH monitoring occasion number for first PO can be signaled by the gNB. The gNB can also signal an offset between the starting PDCCH monitoring occasion of each PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+O)-$^{th}$ PDCCH monitoring occasions for paging.

A 3rd PO is set of X consecutive PDCCH monitoring occasions starting from (P+2O)-$^{th}$ PDCCH monitoring occasions for paging.

A $4^{th}$ PO is set of X consecutive PDCCH monitoring occasions starting from (P+3O) PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions for paging from the start of the determined PF are sequentially numbered from 0. In other words, the PDCCH monitoring occasions starting from the 1st PDCCH monitoring occasion for paging in the paging frame (or from the start of the paging frame) are sequentially numbered from 0. The first PDCCH monitoring occasion number for the first PO can be signaled by the gNB. The gNB can also signal an offset between the last PDCCH monitoring occasion of a PO and starting the PDCCH monitoring occasion of next PO. For example, if Ns is equal to 4, then the i_s values will be 0 to 3 and there are four POs. The gNB can signal the PDCCH monitoring occasion number (P) of the first PO and an offset O.

A 1st PO is set of X consecutive PDCCH monitoring occasions starting from P-$^{th}$ PDCCH monitoring occasions for paging.

A 2nd PO is set of X consecutive PDCCH monitoring occasions starting from (P+X+O)-$^{th}$ PDCCH monitoring occasions for paging.

A 3rd PO is set of X consecutive PDCCH monitoring occasions starting from (P+2X+2O)-$^{th}$ PDCCH monitoring occasions for paging.

A $4^{th}$ PO is set of X consecutive PDCCH monitoring occasions starting from (P+3X+3O)-$^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the slot index for the first PO can be signaled by the gNB. The gNB can also signal an offset between the starting slot of each PO. For example, if Ns is equal to 4, then the i_s values will be 0 to 3 and there are four POs. The gNB can signal slot index (S) of the first PO and an offset O.

A 1st PO is set of X consecutive PDCCH monitoring occasions starting from $1^{st}$ PDCCH monitoring occasion in slot S of paging frame.

A 2nd PO is set of X consecutive PDCCH monitoring occasions starting from $1^{st}$ PDCCH monitoring occasion in slot S+O.

A 3rd PO is set of X consecutive PDCCH monitoring occasions starting from $1^{st}$ PDCCH monitoring occasion in slot S+2O.

A $4^{th}$ PO is set of X consecutive PDCCH monitoring occasions starting from $1^{st}$ PDCCH monitoring occasion in slot S+3O and so on.

Where X is a number of SSBs. In one embodiment X, is maximum number of SSBs (i.e., L). In another embodiment, X is equal to actual transmitted SSBs. In an embodiment, whether X is the actual transmitted SSBs or not can be indicated by the network in the system information.

Option 2: The paging search space is configured by the gNB, wherein the searchSpaceId zero is configured for the Paging Search Space The UE determines the RMSI pattern from the RMSI configuration signaled by the gNB.

If RMSI pattern is 2 or 3,
 A $1^{st}$ PO is the set of PDCCH monitoring occasions for the RMSI in the $1^{st}$ half frame of the determined PF
 A $2^{nd}$ PO is the set of PDCCH monitoring occasions for the RMSI in the $2^{nd}$ half frame of the determined PF
If RMSI pattern is 1,
 $1^{st}$ PO is the set of PDCCH monitoring occasions for the RMSI, wherein the $1^{st}$ PDCCH monitoring occasion starts in the determined PF.

Option 3: The paging search space is configured by the gNB, wherein the searchSpaceId zero is configured for the Paging Search Space If the paging search space with the search space Id zero is configured by the gNB, the PDCCH monitoring occasions for paging are same as the PDCCH monitoring occasions for the RMSI. Based on the RMSI configuration, the UE knows the PDCCH monitoring occasions for paging in the determined PF and subsequent radio frames. The UE knows the 1st PDCCH monitoring occasion for paging in the PF and also the subsequent PDCCH monitoring occasions for paging.

The PDCCH monitoring occasions starting from the 1st PDCCH monitoring occasion for paging in the paging frame (or from the start of PF) are sequentially numbered from 0.

A 1st PO is set of X consecutive PDCCH monitoring occasions starting from $0\text{-}^{th}$ PDCCH monitoring occasions for paging.

A 2nd PO is set of X consecutive PDCCH monitoring occasions starting from $X\text{-}^{th}$ PDCCH monitoring occasions for paging.

A 3rd PO is set of X consecutive PDCCH monitoring occasions starting from $2X\text{-}^{th}$ PDCCH monitoring occasions for paging.

An ith PO is set of X consecutive PDCCH monitoring occasions starting from $(i*X)\text{-}^{th}$ PDCCH monitoring occasions for paging and so on.

Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Alternately, the PDCCH monitoring occasions starting from the 1st PDCCH monitoring occasion for paging in the paging frame (or from the start of the PF) are sequentially numbered from 1.

A 1st PO is set of X consecutive PDCCH monitoring occasions starting from $1^{st}$ PDCCH monitoring occasions for paging.

A 2nd PO is set of X consecutive PDCCH monitoring occasions starting from $X+1\text{-}^{th}$ PDCCH monitoring occasions for paging.

A 3rd PO is set of X consecutive PDCCH monitoring occasions starting from $2X+1\text{-}^{th}$ PDCCH monitoring occasions for paging and so on.

An ith PO is set of X consecutive PDCCH monitoring occasions starting from $[(i-1)*X)]+1\text{-}^{th}$ PDCCH monitoring occasions for paging Where X is a number of SSBs. In one embodiment, X is a maximum number of SSBs (i.e., L). In another embodiment, X is equal to actual transmitted SSBs. In an embodiment, whether X is the actual transmitted SSBs or not can be indicated by the network in the system information.

Option 4: Subframes or slots corresponding to each PO is pre-defined as in LTE.

In the methods explained above, if 'X' is the actual number of transmitted SSBs, then these X SSBs are mapped to X PDCCH monitoring occasions in PO sequentially in ascending order of SSB index. For example, let's say L i.e. maximum number of SSBs are 8 (having SSB index 0 to 7). If the actual transmitted SSBs are SSB1, SSB4, SSB 5 and SSB 7, then X is equal 4. The SSB1 is mapped to the first PDCCH monitoring occasion of PO, the SSB4 is mapped to the second PDCCH monitoring occasion of the PO, the SSB5 is mapped to the third PDCCH monitoring occasion of the PO and the SSB7 is mapped to the fourth PDCCH monitoring occasion of the PO.

Figure 11:
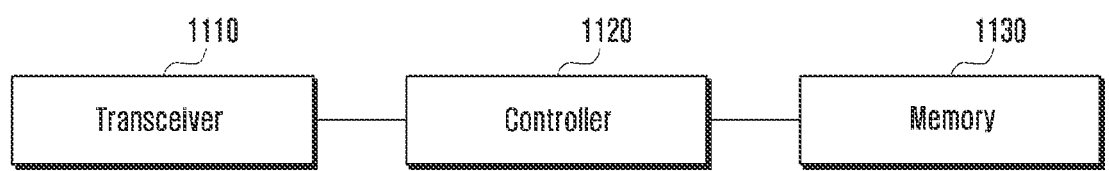
FIG. 11 is a block diagram of a terminal according to an embodiment of the disclosure.

FIG. 11 is a block diagram of a terminal according to an embodiment of the disclosure.

Referring to FIG. 11, a terminal includes a transceiver 1110, a controller 1120 and a memory 1130. The transceiver 1110, the controller 1120 and the memory 1130 are configured to perform the operations of the UE illustrated in the figures, e.g. FIGS. 1 to 10, or described above. Although the transceiver 1110, the controller 1120 and the memory 1130 are shown as separate entities, they may be realized as a single entity like a single chip. Or, the transceiver 1110, the controller 1120 and the memory 1130 may be electrically connected to or coupled with each other.

The transceiver 1110 may transmit and receive signals to and from other network entities, e.g., a BS.

The controller 1120 may control the UE to perform functions according to one of the embodiments described above. The controller 1120 may refer to a circuitry, an ASIC, or at least one processor.

In an embodiment, the operations of the terminal may be implemented using the memory 1130 storing corresponding program codes. Specifically, the terminal may be equipped with the memory 1130 to store program codes implementing desired operations. To perform the desired operations, the controller 1120 may read and execute the program codes stored in the memory 1130 by using a processor or a central processing unit (CPU).

Figure 12:
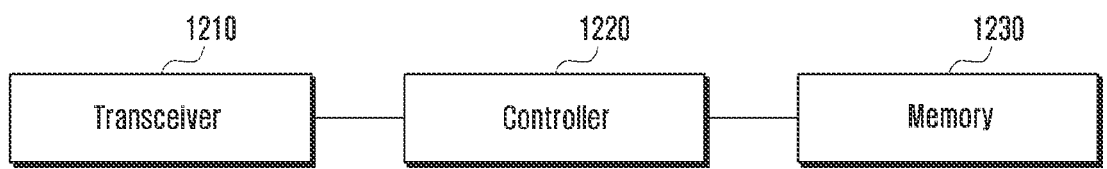
FIG. 12 is a block diagram of a base station (BS) according to an embodiment of the disclosure.

FIG. 12 is a block diagram of a BS according to an embodiment of the disclosure.

Referring to FIG. 12, a BS includes a transceiver 1210, a controller 1220 and a memory 1230. The transceiver 1210, the controller 1220 and the memory 1230 are configured to perform the operations of the network (e.g., gNB) illustrated in the figures, e.g. FIGS. 1 to 10, or described above. Although the transceiver 1210, the controller 1220 and the memory 1230 are shown as separate entities, they may be realized as a single entity like a single chip. The transceiver 1210, the controller 1220 and the memory 1230 may be electrically connected to or coupled with each other.

The transceiver 1210 may transmit and receive signals to and from other network entities, e.g., a terminal.

The controller 1220 may control the BS to perform functions according to one of the embodiments described above. The controller 1220 may refer to a circuitry, an ASIC, or at least one processor.

In an embodiment, the operations of the BS may be implemented using the memory 1230 storing corresponding program codes. Specifically, the BS may be equipped with the memory 1230 to store program codes implementing desired operations. To perform the desired operations, the controller 1220 may read and execute the program codes stored in the memory 1230 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
   transmitting, to a terminal, first information on a number of paging frames in a discontinuous reception (DRX) cycle, second information on an offset (Offset), third information on a number of paging occasions (POs) per paging frame, and fourth information associated with actual transmitted synchronization signal blocks (SSBs); and
   transmitting, to the terminal, downlink control information (DCI) for paging in a PO of a paging frame, wherein the first information and the second information are used for indicating the paging frame, wherein the first information and the third information are used for indicating an index for the PO, the PO including one or more physical downlink control channel (PDCCH) monitoring occasions for paging, and wherein a number of the PDCCH monitoring occasions for paging corresponds to a number of the SSBs.

2. The method of claim 1, wherein the fourth information is used for indicating from where a first PDCCH monitoring occasion for paging in the PO starts.

3. The method of claim 1, wherein fifth information on a first PDCCH monitoring occasion number of each PO is further transmitted to the terminal, and wherein the fifth information is used for indicating from where a first PDCCH monitoring occasion for paging in the PO starts.

4. The method of claim 1, wherein the PDCCH monitoring occasions for paging are sequentially numbered from zero starting from a first PDCCH monitoring occasion in the paging frame, and wherein the PDCCH monitoring occasions for paging are based on a paging search space configuration transmitted to the terminal.

5. The method of claim 1, wherein a system frame number, SFN, of the paging frame is related to the number of paging frames in the DRX cycle, N, and the Offset according to Equation 1:

$$(SFN+Offset) \bmod T = (T \operatorname{div} N)*(UE\_ID \bmod N) \quad \text{Equation 1,}$$

wherein an index of the PO, i_s, is related to the N and the number of POs per paging frame, Ns, according to Equation 2:

$$i\_s = \operatorname{floor}(UE\_ID/N) \bmod Ns \quad \text{Equation 2, and}$$

wherein the T is the DRX cycle, and the UE_ID is an identity of the terminal.

6. A method performed by a terminal in a wireless communication system, the method comprising:

receiving, from a base station, first information on a number of paging frames in a discontinuous reception (DRX) cycle, second information on an offset (Offset), third information on a number of paging occasions (POs) per paging frame, and fourth information associated with actual transmitted synchronization signal blocks (SSBs);

identifying a paging frame based on the first information and the second information;

identifying an index for a PO based on the first information and the third information, the PO including one or more physical downlink control channel (PDCCH) monitoring occasions for paging; and monitoring downlink control information (DCI) in the PO based on the one or more PDCCH monitoring occasions for paging, wherein a number of the PDCCH monitoring occasions for paging corresponds to a number of the SSBs.

7. The method of claim 6, further comprising:

identifying from where a first PDCCH monitoring occasion for paging in the PO starts based on the fourth information.

8. The method of claim 6, wherein fifth information on a first PDCCH monitoring occasion number of each PO is further received from the base station, and wherein the method further comprises identifying from where a first PDCCH monitoring occasion for paging in the PO starts based on the fifth information.

9. The method of claim 6, wherein the PDCCH monitoring occasions for paging are sequentially numbered from zero starting from a first PDCCH monitoring occasion in the paging frame, and wherein the PDCCH monitoring occasions for paging are based on a paging search space configuration received from the base station.

10. The method of claim 6, wherein a system frame number, SFN, of the paging frame is related to the number of paging frames in the DRX cycle, N, and the Offset according to Equation 1:

$$(SFN+Offset) \bmod T = (T \operatorname{div} N)*(UE\_ID \bmod N) \quad \text{Equation 1,}$$

wherein an index of the PO, i_s, is related to the N and the number of POs per paging frame, Ns, according to Equation 2:

$$i\_s = \operatorname{floor}(UE\_ID/N) \bmod Ns \quad \text{Equation 2, and}$$

wherein the T is the DRX cycle, and the UE_ID is an identity of the terminal.

11. A base station in a wireless communication system, the base station comprising:

a transceiver; and a controller configured to:

control the transceiver to transmit, to a terminal, first information on a number of paging frames in a discontinuous reception (DRX) cycle, second information on an offset (Offset), third information on a number of paging occasions (POs) per paging frame, and fourth information associated with actual transmitted synchronization signal blocks (SSBs), and control the transceiver to transmit, to the terminal, downlink control information (DCI) for paging in a PO of a paging frame, wherein the first information and the second information are used for indicating the paging frame, wherein the first information and the third information are used for indicating an index for the PO, the PO including one or more physical downlink control channel (PDCCH) monitoring occasions for paging, and wherein a number of the PDCCH monitoring occasions for paging corresponds a the number of the SSBs.

12. The base station of claim 11, wherein the fourth information is used for indicating from where a first PDCCH monitoring occasion for paging in the PO starts.

13. The base station of claim 11, wherein fifth information on a first PDCCH monitoring occasion number of each PO is further transmitted to the terminal, and wherein the fifth information is used for indicating from where a first PDCCH monitoring occasion for paging in the PO starts.

14. The base station of claim 11, wherein the PDCCH monitoring occasions for paging are sequentially numbered from zero starting from a first PDCCH monitoring occasion in the paging frame, and wherein the PDCCH monitoring occasions for paging are based on a paging search space configuration transmitted to the terminal.

15. The base station of claim 11, wherein a system frame number, SFN, of the paging frame is related to the number of paging frames in the DRX cycle, N, and the Offset according to Equation 1:

$$(SFN+Offset) \bmod T = (T \operatorname{div} N)*(UE\_ID \bmod N) \quad \text{Equation 1,}$$

wherein an index of the PO, i_s, is related to the N and the number of POs per paging frame, Ns, according to Equation 2:

$$i\_s = \text{floor}(UE\_ID/N) \bmod Ns \qquad \text{Equation 2, and}$$

wherein the T is the DRX cycle, and the UE_ID is an identity of the terminal.

16. A terminal in a wireless communication system, the terminal comprising:
    a transceiver; and
    a controller configured to:
        control the transceiver to receive, from a base station, first information on a number of paging frames in a discontinuous reception (DRX) cycle, second information on an offset (Offset), third information on a number of paging occasions (POs) per paging frame, and fourth information associated with actual transmitted synchronization signal blocks (SSBs),
        identify a paging frame based on the first information and the second information,
        identify an index for a PO based on the first information and the third information, the PO including one or more physical downlink control channel (PDCCH) monitoring occasions for paging, and
        monitor downlink control information (DCI) in the PO based on the one or more PDCCH monitoring occasions for paging,
    wherein a number of the PDCCH monitoring occasions for paging corresponds to a number of the SSBs.

17. The terminal of claim 16, wherein the controller is further configured to identify from where a first PDCCH monitoring occasion for paging in the PO starts based on the fourth information.

18. The terminal of claim 16,
    wherein fifth information on a first PDCCH monitoring occasion number of each PO is further received from the base station, and
    wherein the controller is further configured to identify from where a first PDCCH monitoring occasion for paging in the PO starts based on the fifth information.

19. The terminal of claim 16,
    wherein the PDCCH monitoring occasions for paging are sequentially numbered from zero starting from a first PDCCH monitoring occasion in the paging frame, and
    wherein the PDCCH monitoring occasions for paging are based on a paging search space configuration received from the base station.

20. The terminal of claim 16,
    wherein a system frame number, SFN, of the paging frame is related to the number of paging frames in the DRX cycle, N, and the Offset according to Equation 1:

$$(SFN + \text{Offset}) \bmod T = (T \text{ div } N) * (UE\_ID \bmod N) \qquad \text{Equation 1,}$$

wherein an index of the PO, i_s, is related to the N and the number of POs per paging frame, Ns, according to Equation 2:

$$i\_s = \text{floor}(UE\_ID/N) \bmod Ns \qquad \text{Equation 2, and}$$

wherein the T is the DRX cycle, and the UE_ID is an identity of the terminal.

* * * * *